United States Patent
Mostafa et al.

(10) Patent No.: US 10,430,645 B2
(45) Date of Patent: Oct. 1, 2019

(54) FACIAL RECOGNITION OPERATIONS BASED ON POSE

(71) Applicant: Apple Inc., Cupertino, CA (US)

(72) Inventors: Eslam A. Mostafa, Sunnyvale, CA (US); Thorsten Gernoth, San Francisco, CA (US); Kelsey Y. Ho, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/240,970

(22) Filed: Jan. 7, 2019

(65) Prior Publication Data

US 2019/0213394 A1 Jul. 11, 2019

Related U.S. Application Data

(63) Continuation of application No. 16/051,030, filed on Jul. 31, 2018, now Pat. No. 10,210,381.

(60) Provisional application No. 62/539,739, filed on Aug. 1, 2017, provisional application No. 62/556,850, filed (Continued)

(51) Int. Cl.
*G06K 9/00* (2006.01)
*G06F 21/32* (2013.01)

(52) U.S. Cl.
CPC ......... *G06K 9/00288* (2013.01); *G06F 21/32* (2013.01); *G06T 2207/20084* (2013.01)

(58) Field of Classification Search
CPC ........... G06K 9/00288; G06K 9/00295; G06K 9/00268; G06F 21/32; G06T 2207/20084
See application file for complete search history.

(56) References Cited

U.S. PATENT DOCUMENTS

| | | |
|---|---|---|
| 7,734,067 B2 | 6/2010 | Kim et al. |
| 8,150,142 B2 | 4/2012 | Freedman et al. |
| 8,384,997 B2 | 2/2013 | Shpunt et al. |
| (Continued) | | |

FOREIGN PATENT DOCUMENTS

| | | |
|---|---|---|
| EP | 1416427 A2 | 5/2004 |
| EP | 3168777 A1 | 5/2017 |
| WO | 2012036692 A1 | 3/2012 |

OTHER PUBLICATIONS

U.S. Appl. No. 16/051,030, filed Jul. 7, 2018, Eslam A. Mostafa.
ISR&WO, PCT/US2019/033356, dated Jul. 30, 2019, 14 pages.

*Primary Examiner* — Phuoc Tran
(74) *Attorney, Agent, or Firm* — Meyertons, Hood, Kivlin, Kowert & Goetzel, P.C.; Gareth M. Sampson

(57) ABSTRACT

A facial recognition authentication on a device having a camera may operate with multiple enrollment profiles on the device. Multiple enrollment profiles may include separate profiles for different appearances of a user and/or separate profiles for different users authorized to use the device. The enrollment profiles may be generated using an enrollment process where the enrollment process is operated separately to generate each of the different enrollment profiles. During the facial recognition authentication process, a user may unlock the device by having a matching score for image(s) captured of the user that that exceeds an unlock threshold for at least one of the enrollment profiles. The user may have a matching score that exceeds the unlock threshold for multiple enrollment profiles. Each enrollment profile unlocks the device for the user may be updated using a template update process that operates independently for each enrollment profile.

20 Claims, 15 Drawing Sheets

Related U.S. Application Data on Sep. 11, 2017, provisional application No. 62/679,846, filed on Jun. 3, 2018.

(56) References Cited

U.S. PATENT DOCUMENTS

| | | |
|---|---|---|
| 8,749,796 B2 | 6/2014 | Pesach et al. |
| 8,913,839 B2 | 12/2014 | Ricanek, Jr. et al. |
| 9,230,152 B2 | 1/2016 | Boshra |
| 9,292,728 B2 | 5/2016 | Boshra et al. |
| 9,576,126 B2 | 2/2017 | Boshra et al. |
| 9,721,150 B2 | 8/2017 | Gottemukkula et al. |
| 9,836,643 B2 | 12/2017 | Saripalle et al. |
| 2009/0185723 A1 | 7/2009 | Kurtz et al. |
| 2013/0138657 A1 | 5/2013 | Govindarao et al. |
| 2013/0247175 A1 | 9/2013 | Nechyba et al. |
| 2015/0092996 A1 | 4/2015 | Tian |
| 2015/0013949 A1 | 5/2015 | Murakami et al. |
| 2016/0086013 A1 | 3/2016 | Boshra |
| 2016/0125223 A1 | 5/2016 | Boshra et al. |
| 2016/0178915 A1 | 6/2016 | Mor et al. |
| 2016/0203306 A1 | 7/2016 | Boshra |
| 2016/0217319 A1* | 7/2016 | Bhanu ................ G06K 9/00288 |
| 2017/0053108 A1* | 2/2017 | Jakobsson ........... H04L 63/0861 |
| 2017/0286790 A1 | 10/2017 | Mapen et al. |
| 2017/0344807 A1 | 11/2017 | Jillela et al. |

* cited by examiner

FACIAL RECOGNITION OPERATIONS BASED ON POSE

PRIORITY CLAIM

This patent is a continuation of U.S. patent application Ser. No. 16/051,030 to Mostafa et al., entitled "MULTIPLE ENROLLMENTS IN FACIAL RECOGNITION", filed Jul. 31, 2018, which claims priority to U.S. Provisional Patent Application No. 62/539,739 to Mostafa et al., entitled "ONLINE LEARNING TO UPDATE TEMPLATES USED IN FACIAL RECOGNITION FOR CHANGES IN THE USER", filed Aug. 1, 2017; to U.S. Provisional Patent Application No. 62/556,850 to Mostafa et al., entitled "PROCESS FOR UPDATING TEMPLATES USED IN FACIAL RECOGNITION", filed Sep. 11, 2017; and to U.S. Provisional Patent Application No. 62/679,846 to Mostafa et al., entitled "MULTIPLE ENROLLMENTS IN FACIAL RECOGNITION", filed Jun. 3, 2018, each of which are incorporated by reference in their entirety.

BACKGROUND

1. Technical Field

Embodiments described herein relate to methods and systems for face detection and recognition in images captured by a camera on a device. More particularly, embodiments described herein relate to the use of multiple profiles for face recognition and methods for updating the profiles during use of the device.

2. Description of Related Art

Biometric authentication processes are being used more frequently to allow users to more readily access their devices without the need for passcode or password authentication. One example of a biometric authentication process is fingerprint authentication using a fingerprint sensor. Facial recognition is another biometric process that may be used for authentication of an authorized user of a device. Facial recognition processes are generally used to identify individuals in an image and/or compare individuals in images to a database of individuals to match the faces of individuals.

For authentication using facial recognition, the facial recognition system generally struggles to adapt to changes in the authorized user's facial features over time so that the user may continue to access the device using facial recognition even as facial features of the user change and create differences in images of the user. For example, the user's facial features may change over time due to facial hair changes, haircuts, gaining/losing weight, and/or aging.

There may also be a desire for a device to allow multiple (two or more) enrollment profiles on the device. In some cases, multiple enrollment profiles may be desired if a user has two or more distinct (or diverse) appearance looks. The distinct appearance looks may include, for example, appearances differentiated by wearing versus not wearing glasses, having a bearded face versus a shaved face, and/or a face with heavy makeup versus a face without makeup. Additionally, multiple enrollment profiles may be utilized if it is desired to have more than user have access to the device using facial recognition.

The facial recognition system, however, needs to remain secure with the use of multiple enrollment profiles while allowing the facial recognition system to adapt to changes in the user(s) appearance in each of the different enrollment profiles. Thus, the facial recognition system needs to adapt to the changes while also ensuring that the differences are recognized as changes for a particular enrollment profile.

SUMMARY

Multiple enrollment profiles may be used for facial recognition authentication on a device having a camera. The enrollment profiles may include profiles for different appearances of a user and/or different users authorized to use the device. An enrollment process may be used to generate templates for each enrollment profile on the device.

When a user attempts to gain access to the device using facial recognition authentication, features from image(s) captured of the user may be compared to each of the enrollment profiles on the device. The user may gain access to the device by having a matching score with at least one of the enrollment profiles that exceeds an unlock threshold for the facial recognition authentication process. Templates for the enrollment profile used to unlock the device may be updated with features from the image(s) captured of the user using a template update process. If the user has a matching score above the unlock threshold for multiple enrollment profiles, then templates in each of the enrollment profiles may be updated using separate template processes operating in parallel on the device. Thus, templates for each enrollment profile may be updated by the device as features of the user for the enrollment profile change over time.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

Figure 1:
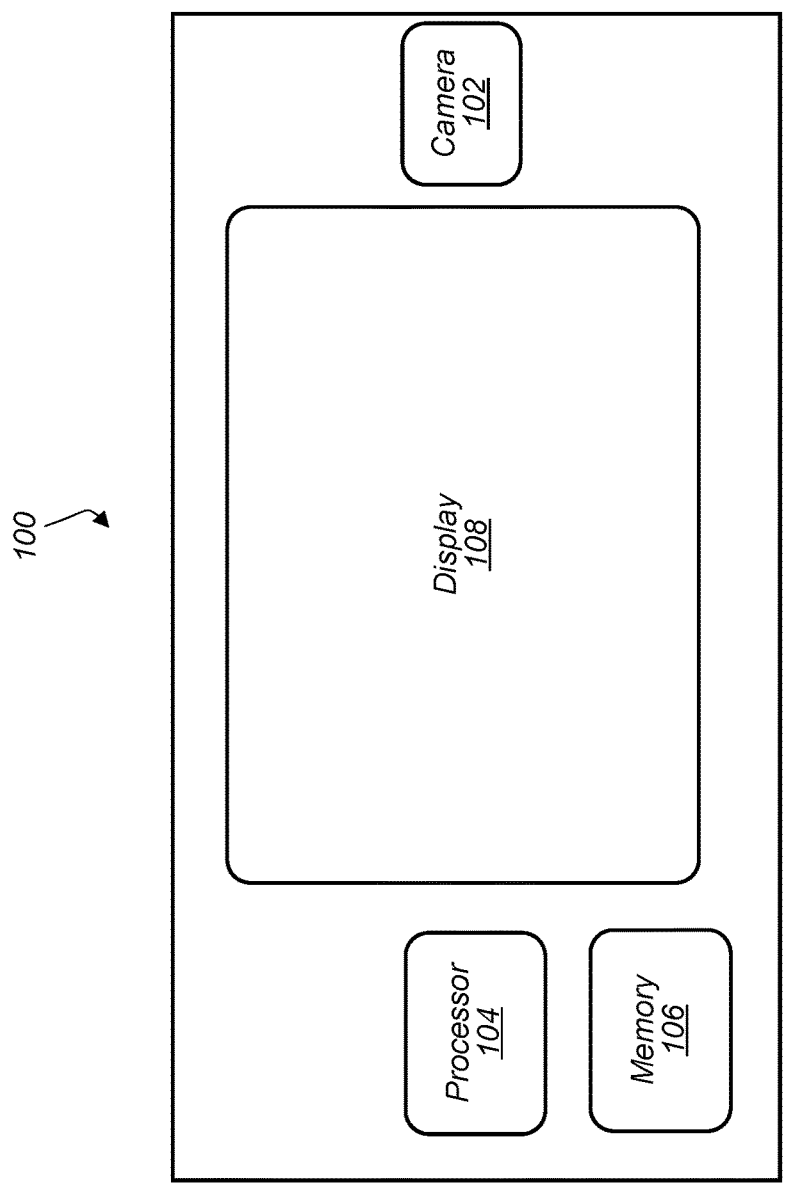
FIG. 1 depicts a representation of an embodiment of a device including a camera.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

As described herein, one aspect of the present technology is the gathering and use of data available from various sources to improve the operation and access to devices. The present disclosure contemplates that in some instances, this gathered data may include personal information data that uniquely identifies or can be used to contact or locate a specific person. Such personal information data can include image data (e.g., data from images of the user), demographic data, location-based data, telephone numbers, email addresses, home addresses, or any other identifying information. For image data, the personal information data may only include data from the images of the user and not the images themselves.

The present disclosure recognizes that the use of such personal information data, in the present technology, can be used to the benefit of users. For example, the personal information data can be used to control unlocking and/or authorizing devices using facial recognition. Accordingly, use of such personal information data enables calculated control of access to devices. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, in the case of unlocking and/or authorizing devices using facial recognition, personal information from users should be collected for legitimate and reasonable uses of the entity, as such uses pertain only to operation of the devices, and not shared or sold outside of those legitimate uses. Further, such collection should occur only after receiving the informed consent of the users and the personal information data should remain secured on the devices on which the personal information is collected. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services.

FIG. 1 depicts a representation of an embodiment of a device including a camera. In certain embodiments, device 100 includes camera 102, processor 104, memory 106, and display 108. Device 100 may be a small computing device, which may be, in some cases, small enough to be handheld (and hence also commonly known as a handheld computer or simply a handheld). In certain embodiments, device 100 is any of various types of computer systems devices which are mobile or portable and which perform wireless communications using WLAN communication (e.g., a "mobile device"). Examples of mobile devices include mobile telephones or smart phones, and tablet computers. Various other types of devices may fall into this category if they include wireless or RF communication capabilities (e.g., Wi-Fi, cellular, and/or Bluetooth), such as laptop computers, portable gaming devices, portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using, for example, WLAN, Wi-Fi, cellular, and/or Bluetooth. In certain embodiments, device 100 includes any device used by a user with processor 104, memory 106, and display 108. Display 108 may be, for example, an LCD screen or touchscreen. In some embodiments, display 108 includes a user input interface for device 100 (e.g., the display allows interactive input for the user).

Figure 2:
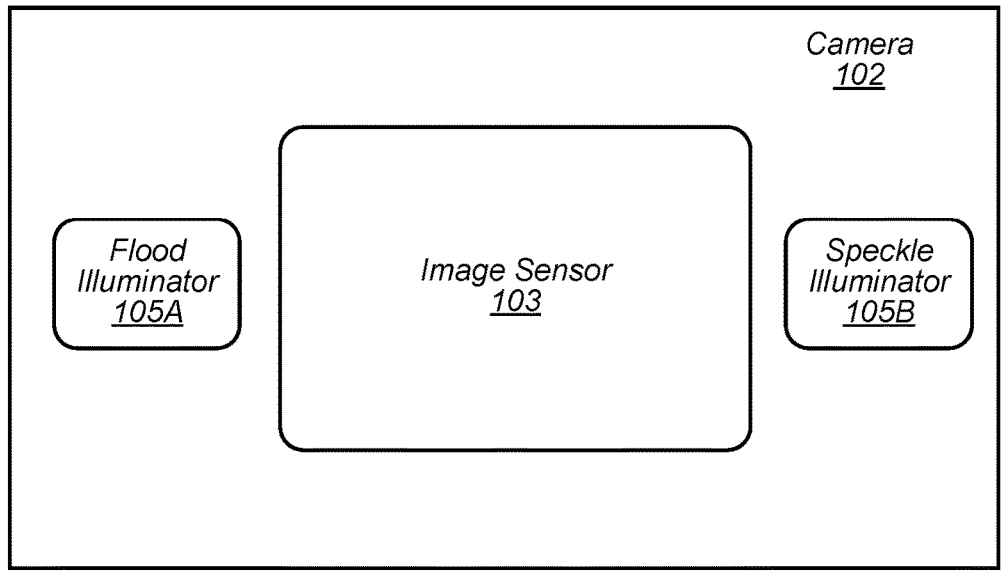
FIG. 2 depicts a representation of an embodiment of a camera.

Camera 102 may be used to capture images of the external environment of device 100. In certain embodiments, camera 102 is positioned to capture images in front of display 108. Camera 102 may be positioned to capture images of the user (e.g., the user's face) while the user interacts with display 108. FIG. 2 depicts a representation of an embodiment of camera 102. In certain embodiments, camera 102 includes one or more lenses and one or more image sensors 103 for capturing digital images. Digital images captured by camera 102 may include, for example, still images, video images, and/or frame-by-frame images.

In certain embodiments, camera 102 includes image sensor 103. Image sensor 103 may be, for example, an array of sensors. Sensors in the sensor array may include, but not be limited to, charge coupled device (CCD) and/or complementary metal oxide semiconductor (CMOS) sensor elements to capture infrared images (IR) or other non-visible electromagnetic radiation. In some embodiments, camera 102 includes more than one image sensor to capture multiple types of images. For example, camera 102 may include both IR sensors and RGB (red, green, and blue) sensors. In certain embodiments, camera 102 includes illuminators 105 for illuminating surfaces (or subjects) with the different types of light detected by image sensor 103. For example, camera 102 may include an illuminator for visible light (e.g., a "flash illuminator), illuminators for RGB light, and/or illuminators for infrared light (e.g., a flood IR source and a speckle pattern projector). In some embodiments, the flood IR source and speckle pattern projector are other wavelengths of light (e.g., not infrared). In certain embodiments, illuminators 105 include an array of light sources such as, but not limited to, VCSELs (vertical-cavity surface-emitting lasers). In some embodiments, image sensors 103 and illuminators 105 are included in a single chip package. In some embodiments, image sensors 103 and illuminators 105 are located on separate chip packages.

In certain embodiments, image sensor 103 is an IR image sensor and the image sensor is used to capture infrared images used for face detection, facial recognition authentication, and/or depth detection. Other embodiments of image sensor 103 (e.g., an RGB image sensor) may also be contemplated for use in face detection, facial recognition authentication, and/or depth detection as described herein. For face detection, illuminator 105A may provide flood IR illumination to flood the subject with IR illumination (e.g., an IR flashlight) and image sensor 103 may capture images of the flood IR illuminated subject. Flood IR illumination images may be, for example, two-dimensional images of the subject illuminated by IR light. For depth detection or generating a depth map image, illuminator 105B may provide IR illumination with a speckle pattern. The speckle pattern may be a pattern of light spots (e.g., a pattern of dots) with a known, and controllable, configuration and pattern projected onto a subject. Illuminator 105B may include a VCSEL array configured to form the speckle pattern or a light source and patterned transparency configured to form the speckle pattern. The configuration and pattern of the speckle pattern provided by illuminator 105B may be selected, for example, based on a desired speckle pattern density (e.g., dot density) at the subject. Image sensor 103 may capture images of the subject illuminated by the speckle pattern. The captured image of the speckle pattern on the subject may be assessed (e.g., analyzed and/or processed) by an imaging and processing system (e.g., an image signal processor (ISP) as described herein) to produce or estimate a three-dimensional map of the subject (e.g., a depth map or depth map image of the subject). Examples of depth map imaging are described in U.S. Pat. No. 8,150,142 to Freedman et al., U.S. Pat. No. 8,749,796 to Pesach et al., and U.S. Pat. No. 8,384,997 to Shpunt et al., which are incorporated by reference as if fully set forth herein, and in U.S. Patent Application Publication No. 2016/0178915 to Mor et al., which is incorporated by reference as if fully set forth herein.

In certain embodiments, images captured by camera 102 include images with the user's face (e.g., the user's face is included in the images). An image with the user's face may include any digital image with at least some portion of the user's face shown within the frame of the image. Such an image may include just the user's face or may include the user's face in a smaller part or portion of the image. The user's face may be captured with sufficient resolution in the image to allow image processing of one or more features of the user's face in the image.

Figure 3:
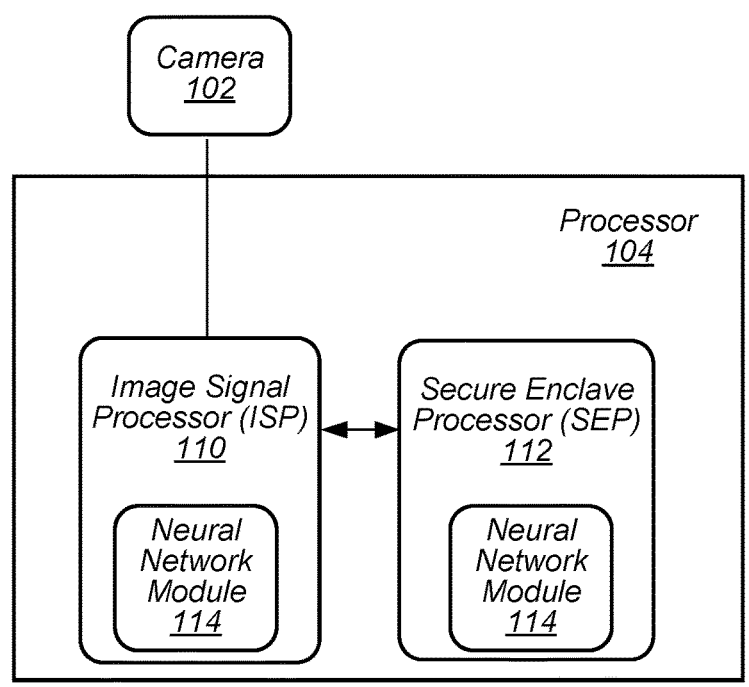
FIG. 3 depicts a representation of an embodiment of a processor on a device.

Images captured by camera 102 may be processed by processor 104. FIG. 3 depicts a representation of an embodiment of processor 104 included in device 100. Processor 104 may include circuitry configured to execute instructions defined in an instruction set architecture implemented by the processor. Processor 104 may execute the main control software of device 100, such as an operating system. Generally, software executed by processor 104 during use may control the other components of device 100 to realize the desired functionality of the device. The processors may also execute other software. These applications may provide user functionality, and may rely on the operating system for lower-level device control, scheduling, memory management, etc.

In certain embodiments, processor 104 includes image signal processor (ISP) 110. ISP 110 may include circuitry suitable for processing images (e.g., image signal processing circuitry) received from camera 102. ISP 110 may include any hardware and/or software (e.g., program instructions) capable of processing or analyzing images captured by camera 102.

In certain embodiments, processor 104 includes secure enclave processor (SEP) 112. In some embodiments, SEP 112 is involved in a facial recognition authentication process involving images captured by camera 102 and processed by ISP 110. SEP 112 may be a secure circuit configured to authenticate an active user (e.g., the user that is currently using device 100) as authorized to use device 100. A "secure circuit" may be a circuit that protects an isolated, internal resource from being directly accessed by an external circuit. The internal resource may be memory (e.g., memory 106) that stores sensitive data such as personal information (e.g., biometric information, credit card information, etc.), encryptions keys, random number generator seeds, etc. The internal resource may also be circuitry that performs services/operations associated with sensitive data. As described herein, SEP 112 may include any hardware and/or software (e.g., program instructions) capable of authenticating a user using the facial recognition authentication process. The facial recognition authentication process may authenticate a user by capturing images of the user with camera 102 and comparing the captured images to previously collected images of an authorized user for device 100. In some embodiments, the functions of ISP 110 and SEP 112 may be performed by a single processor (e.g., either ISP 110 or SEP 112 may perform both functionalities and the other processor may be omitted).

Figures 4, 5, 6:
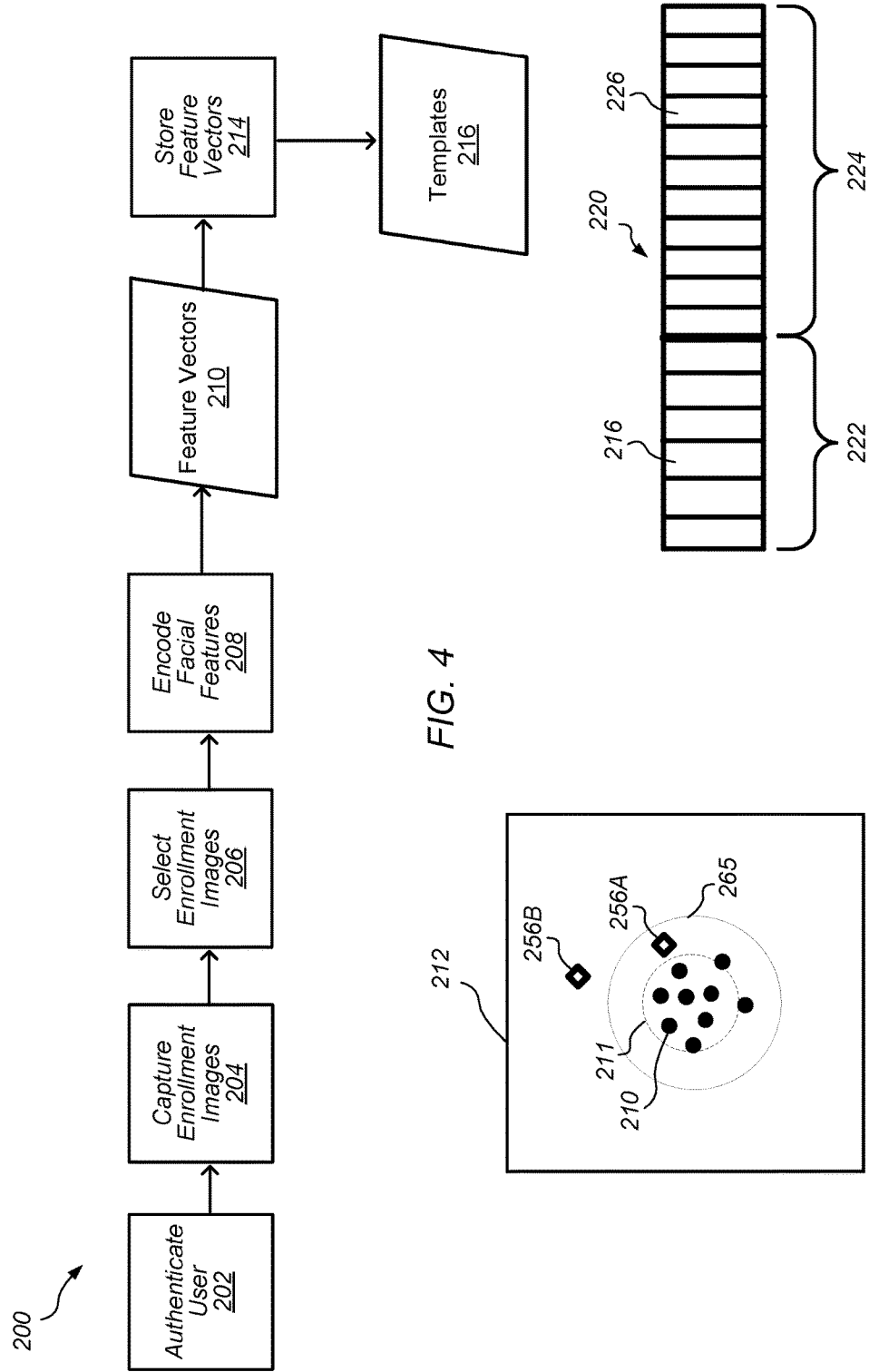
FIG. 4 depicts a flowchart of an embodiment of an image enrollment process for an authorized user of a device.
FIG. 5 depicts a representation of an embodiment of a feature space with feature vectors after an enrollment process.
FIG. 6 depicts a representation of an embodiment of a template space for an enrollment profile in a memory of a device.

In certain embodiments, processor 104 performs an enrollment process (e.g., image enrollment process 200, as shown in FIG. 4, or a registration process) to capture images (e.g., the previously collected images) for an authorized user of device 100. During the enrollment process, camera module 102 may capture (e.g., collect) images and/or image data from an authorized user in order to permit SEP 112 (or another security process) to subsequently authenticate the user using the facial recognition authentication process. In some embodiments, the images and/or image data (e.g., feature vector data from the images) from the enrollment process are used to generate templates in device 100. The templates may be stored, for example, in a template space in memory 106 of device 100. In some embodiments, the template space may be updated by the addition and/or subtraction of templates from the template space. A template update process (e.g., first template update process 300 and/or second template update process 400 described herein) may be performed by processor 104 to add and/or subtract templates from the template space. For example, the template space may be updated with additional templates to adapt to changes in the authorized user's appearance and/or changes in hardware performance over time. Templates may be subtracted from the template space to compensate for the addition of templates when the template space for storing templates is full.

In some embodiments, camera module 102 captures multiple pairs of images for a facial recognition session. Each pair may include an image captured using a two-dimensional capture mode (e.g., a flood IR image) and an image captured using a three-dimensional capture mode (e.g., a depth map image). In certain embodiments, ISP 110 and/or SEP 112 process the flood IR images and depth map images independently of each other before a final authentication decision is made for the user. For example, ISP 110 may process the images independently to determine characteristics of each image separately. SEP 112 may then compare the separate image characteristics with stored templates for each type of image to generate an authentication score (e.g., a matching score or other ranking of matching between the user in the captured image and in the stored templates) for each separate image. The authentication scores for the separate images (e.g., the flood IR and depth map images) may be combined to make a decision on the identity of the user and, if authenticated, allow the user to use device 100 (e.g., unlock the device).

In some embodiments, ISP 110 and/or SEP 112 combine the images in each pair to provide a composite image that is used for facial recognition. In some embodiments, ISP 110 processes the composite image to determine characteristics of the image, which SEP 112 may compare with the stored templates to make a decision on the identity of the user and, if authenticated, allow the user to use device 100.

In some embodiments, the combination of flood IR image data and depth map image data may allow for SEP 112 to compare faces in a three-dimensional space. In some embodiments, camera module 102 communicates image data to SEP 112 via a secure channel. The secure channel may be, for example, either a dedicated path for communicating data (i.e., a path shared by only the intended participants) or a dedicated path for communicating encrypted data using cryptographic keys known only to the intended participants. In some embodiments, camera module 102 and/or ISP 110 may perform various processing operations on image data before supplying the image data to SEP 112 in order to facilitate the comparison performed by the SEP.

In certain embodiments, processor 104 operates one or more machine learning models. Machine learning models may be operated using any combination of hardware and/or software (e.g., program instructions) located in processor 104 and/or on device 100. In some embodiments, one or more neural network modules 114 are used to operate the machine learning models on device 100. Neural network modules 114 may be located in ISP 110 and/or SEP 112.

Neural network module 114 may include any combination of hardware and/or software (e.g., program instructions) located in processor 104 and/or on device 100. In some embodiments, neural network module 114 is a multi-scale neural network or another neural network where the scale of kernels used in the network can vary. In some embodiments, neural network module 114 is a recurrent neural network (RNN) such as, but not limited to, a gated recurrent unit (GRU) recurrent neural network or a long short-term memory (LSTM) recurrent neural network.

Neural network module 114 may include neural network circuitry installed or configured with operating parameters that have been learned by the neural network module or a similar neural network module (e.g., a neural network module operating on a different processor or device). For example, a neural network module may be trained using training images (e.g., reference images) and/or other training data to generate operating parameters for the neural network circuitry. The operating parameters generated from the training may then be provided to neural network module 114 installed on device 100. Providing the operating parameters generated from training to neural network module 114 on device 100 allows the neural network module to operate using training information programmed into the neural network module (e.g., the training-generated operating parameters may be used by the neural network module to operate on and assess images captured by the device).

FIG. 4 depicts a flowchart of an embodiment of image enrollment process 200 for an authorized user of device 100. Process 200 may be used to create an enrollment profile for an authorized user of device 100 that is stored in the device (e.g., in a memory coupled to SEP 112). The enrollment profile may include one or more templates for the authorized user created using process 200. The enrollment profile and the templates associated with the enrollment profile may be used in a facial recognition process to allow (e.g., authorize) the user to use the device and/or perform operations on the device (e.g., unlock the device).

In some embodiments, an authorized user may create multiple enrollment profiles with each enrollment profile created by image enrollment process 200 being associated with the particular images of the user taken during the enrollment process. For example, an authorized user may create a first enrollment profile associated with a first distinct appearance of the user (e.g., the user's face with glasses). The authorized user may also create a second enrollment profile associated with a second distinct appearance of the user (e.g., the user's face without glasses). In some embodiments, the multiple enrollment profiles may include one or more enrollment profiles for an additional user of the device (e.g., a primary authorized user may allow a secondary authorized user to enroll a profile on the device). The multiple enrollment profiles may be used in parallel in the facial recognition process with a user being authorized to use the device (e.g., unlock the device) if the user is authenticated using any of the enrollment profiles created on the device.

In certain embodiments, process 200 is used when device 100 is used a first time by the authorized user and/or when the user opts to create an enrollment profile for a facial recognition process. For example, process 200 may be initiated when device 100 is first obtained by the authorized user (e.g., purchased by the authorized user) and turned on for the first time by the authorized user. In some embodiments, process 200 may be initiated by the authorized user when the user desires to enroll in a facial recognition process, update security settings for device 100, re-enroll, and/or add an enrollment profile on the device.

In certain embodiments, process 200 begins with authenticating the user in 202. In 202, the user may be authenticated on device 100 using a non-facial authentication process. For example, the user may be authenticated as an authorized user by entering a passcode, entering a password, or using another user authentication protocol other than facial recognition. After the user is authenticated in 202, one or more enrollment (e.g., reference or registration) images of the user are captured in 204. The enrollment images may include images of the user illuminated by flood illuminator 105A (e.g., flood IR images) and/or images of the user illuminated by speckle illuminator 105B (e.g., depth map images). As described herein, flood IR images and depth map images may be used independently and/or in combination in facial recognition processes on device 100 (e.g. the images may independently be used to provide an authentication decision and the decisions may be combined to determine a final decision on user authentication).

The enrollment images may be captured using camera 102 as the user interacts with device 100. For example, the enrollment images may be captured as the user follows prompts on display 108 of device 100. The prompts may include instructions for the user to make different motions and/or poses while the enrollment images are being captured. During 204, camera 102 may capture multiple images for each motion and/or pose performed by the user. Capturing images for different motions and/or different poses of the user where the images still have a relatively clear depiction of the user may be useful in providing a better variety of enrollment images that enable the user to be authenticated without having to be in a limited or restricted position relative to camera 102 on device 100.

After the multiple enrollment images are captured in 204, selection of enrollment images for further image processing may be made in 206. Selection of enrollment images 206, and further processing of the images, may be performed by ISP 110 and/or SEP 112. Selection of enrollment images for further processing may include selecting images that are suitable for generating templates. For example, the selection of images that are suitable for use generating templates in 206 may include assessing one or more selected criteria for the images and selecting images that meet the selected criteria. The selected images may be used to generate templates for the user. Selected criteria may include, but not be limited to, the face of the user being in the field of view of the camera, a pose of the user's face being proper (e.g., the user's face is not turned too far in any direction from the camera (i.e., the pitch, yaw, and/or roll of the face are not above certain levels), a distance between camera 102 and the face of the user being in a selected distance range, the face of the user having occlusion below a minimum value (e.g., the user's face is not occluded (blocked) more than a minimum amount by another object), the user paying attention to the camera (e.g., eyes of the user looking at the camera), eyes of the user not being closed, and proper lighting (illumination) in the image. In some embodiments, if more than one face is detected in an enrollment image, the enrollment image is rejected and not used (e.g., not selected) for further processing. Selection of images suitable for further processing may be rule based on the images meeting a certain number of the selected criteria or all of the selected criteria. In some embodiments, occlusion maps and/or landmark feature maps are used in identifying features of the user (e.g., facial features such as eyes, nose, and mouth) in the images and assessing the selected criteria in the images.

After images are selected in 206, features of the user in the selected (template) images may be encoded in 208. Encoding of the selected images may include encoding features (e.g., facial features) of the user to define the features in the images as one or more feature vectors in a feature space. Feature vectors 210 may be the output of the encoding in 208. A feature space may be an n-dimensional feature space. A feature vector may be an n-dimensional vector of numerical values that define features from the image in the feature space (e.g., the feature vector may be a vector of numerical values that define facial features of the user in the image).

FIG. 5 depicts a representation of an embodiment of feature space 212 with feature vectors 210. Each feature vector 210 (black dot) may define facial features for the user from either a single image, from a composite image (e.g., an image that is a composite of several images), or from multiple images. As feature vectors 210 are generated from a single user's facial features, the feature vectors may be similar to one another because the feature vectors are associated with the same person and may have some "clustering", as shown by circle 211 in FIG. 5. Feature vectors 256A and 256B (open diamonds) are feature vectors obtained from facial recognition process 250, described below.

As shown in FIG. 4, process 200 may include, in 214, storing feature vectors 210 in a memory of device 100 (e.g., a memory protected by SEP 112). In certain embodiments, feature vectors 210 are stored as static templates 216 (e.g., enrollment templates or reference templates) in a template space of the memory (e.g., template space 220 described below). Static templates 216 may be used for the enrollment profile created by process 200. In some embodiments, static templates 216 (and other templates described herein) include separate templates for feature vectors obtained from the enrollment flood IR images and for feature vectors obtained from the enrollment depth map images. It is to be understood that the separate templates obtained from flood IR images and depth map images may be used independently and/or in combination during additional processes described herein. For simplicity in this disclosure, static templates 216 are described generically and it should be understood that static templates 216 (and the use of the templates) may refer to either templates obtained from flood IR images or templates obtained from depth map images. In some embodiments, a combination of the flood IR images and depth map images may be used to generate templates. For example, pairs of feature vectors obtained from flood IR images and depth map images may be stored in static templates 216 to be used in one or more facial recognition processes on device 100.

FIG. 6 depicts a representation of an embodiment of template space 220 for an enrollment profile in memory 106 of device 100. In certain embodiments, template space 220 is located in a portion of memory 106 of device 100 protected by SEP 112. In some embodiments, template space 220 includes static portion 222 and dynamic portion 224. Static templates 216 may be, for example, added to static portion 222 of template space 220 (e.g., the templates are permanently added to the memory and are not deleted or changed unless the device is reset). In some embodiments, static portion 222 includes a certain number of static templates 216. For example, for the embodiment of template space 220 depicted in FIG. 6, six static templates 216 are allowed in static portion 222. In some embodiments, nine static templates 216 may be allowed in static portion 222. Other numbers of static templates 216 in static portion 222 may also be contemplated. After the enrollment process for the enrollment profile is completed and static templates 216 are added to static portion 222, additional dynamic templates 226 may be added to dynamic portion 224 of template space 220 for the enrollment profile (e.g., a portion from which templates may be added and deleted without a device reset being needed).

Static templates 216 may thus be enrollment templates (or reference templates) generated by enrollment process 200 for the enrollment profile associated with the enrollment process. After enrollment process 200 is completed, a selected number of static templates 216 are stored in static portion 222 of template space 220 for the enrollment profile. The number of static templates 216 stored in static portion 222 after enrollment process 200 may vary depending on, for example, the number of different feature vectors obtained during the enrollment process, which may be based on the number of images selected to be suitable for use as template images, or a desired number of templates for the device. After enrollment process 200, static templates 216 include feature vectors 210 (e.g., the enrollment or reference feature vectors) that can be used for facial recognition of the authorized user associated with the enrollment profile. Thus, template space 220 may be used in a facial recognition authentication process to authorize the user associated with the enrollment profile.

Figure 7:
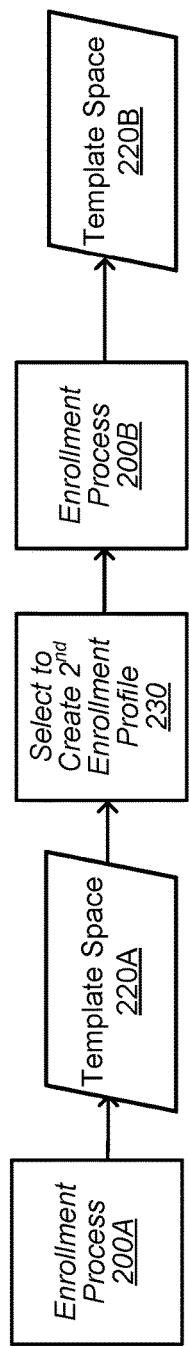
FIG. 7 depicts a flowchart of an embodiment of enrolling multiple enrollment profiles on a device.

In embodiments with multiple enrollment profiles on device 100, enrollment process 200 may be operated separately for each of the enrollment profiles to generate separate (distinct) and independent template spaces (e.g., separate static templates) for each enrollment profile. FIG. 7 depicts a flowchart of an embodiment of enrolling multiple enrollment profiles on a device. Enrollment process 200A may be operated to generate a first enrollment profile on device 100. The first enrollment profile may be associated with an authorized user of device 100 (e.g., the primary authorized user of the device). Enrollment process 200A may generate template space 220A for the first enrollment profile.

After template space 220A is generated, the authorized user may select to create a second enrollment profile in 230. Enrollment process 200B may then be operated to generate a second enrollment profile on device 100. As described herein, the second enrollment profile may be created for a second distinct appearance of the authorized (primary) user or for an additional (e.g., secondary) user of device 100. Enrollment process 200B may generate template space 220B for the second enrollment profile. Enrollment process 200A and enrollment process 200B may operate according to enrollment process 200, depicted in FIG. 4.

Figure 8:
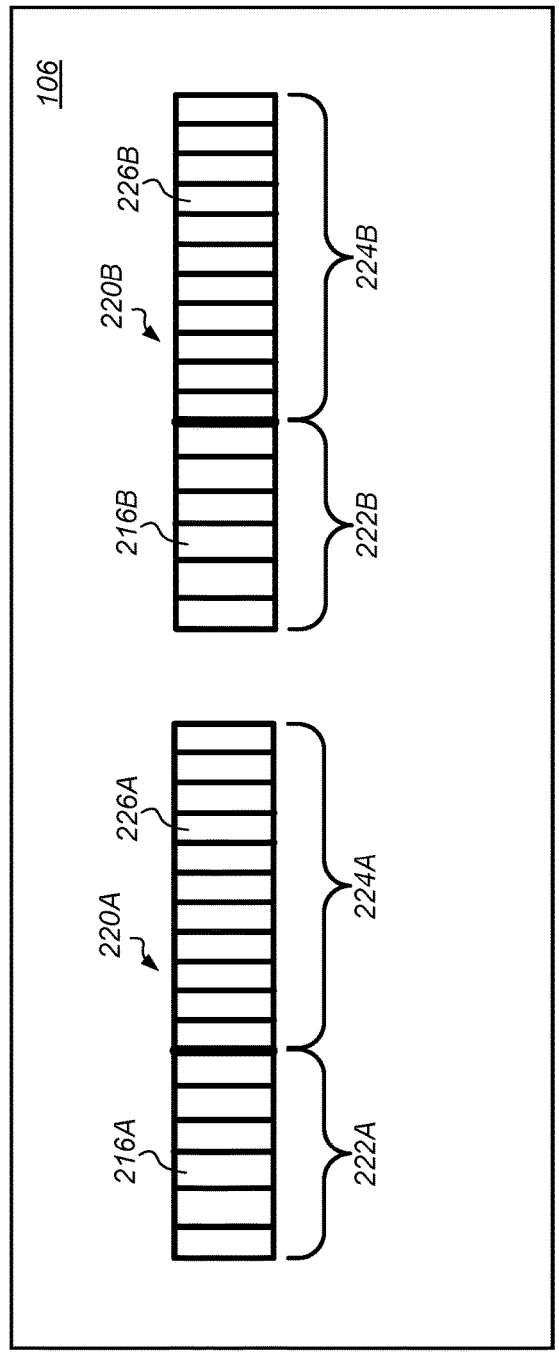
FIG. 8 depicts a representation of an embodiment of two template spaces in a memory of a device.

FIG. 8 depicts a representation of an embodiment of two template spaces 220A, 220B in memory 106 of device 100. Template space 220A may be associated with the first enrollment profile on device 100 and template space 220B may be associated with the second enrollment profile on device 100. While two template spaces (for two enrollment profiles) are depicted in FIGS. 7 and 8, it is to be understood that any number of template spaces (and any corresponding number of enrollment profiles) may be utilized on device 100 as desired based on desired operation of the device in view of available memory and processing power of the device.

As shown in FIG. 8, separate template spaces 220A, 220B may be located in distinct, separated spaces in memory 106 of device 100. For example, template spaces 220 may be stored in partitioned portions of the memory space used for templates in memory 106. In certain embodiments, template spaces 220A, 220B are in a portion of memory 106 of device 100 protected by SEP 112. Template spaces 220A and 220B may include their own distinct and separate static portions 222A and 224A with separate static templates 216A and 216B, respectively. Template spaces 220A and 220B may also include their own distinct and separate dynamic portions 224A and 224B with separate dynamic templates 226A and 226B, respectively. Template spaces 220A, 220B may be separately (e.g., independently) accessed and/or operated on by processor 104 on device 100. For example, template spaces 220A, 220B may be separately accessed by a facial recognition authentication process and separately operated on by a template update process as described herein.

In certain embodiments with multiple enrollment profiles stored on device 100 (e.g., multiple template spaces 220 on the device), all enrollment profiles (and all templates in template spaces) are deleted or removed from the device when the device is reset. All enrollment profiles may also be deleted from device 100 when a request to delete only at least one enrollment profile is made on the device. All enrollment profiles may be deleted to prevent any remaining enrollment profiles from accidentally allowing a user associated with the enrollment profile being requested to be deleted from accessing device 100. For example, there may be overlap between enrollment profiles that may allow a first user to access device 100 with an enrollment profile for a second user.

Figure 9:
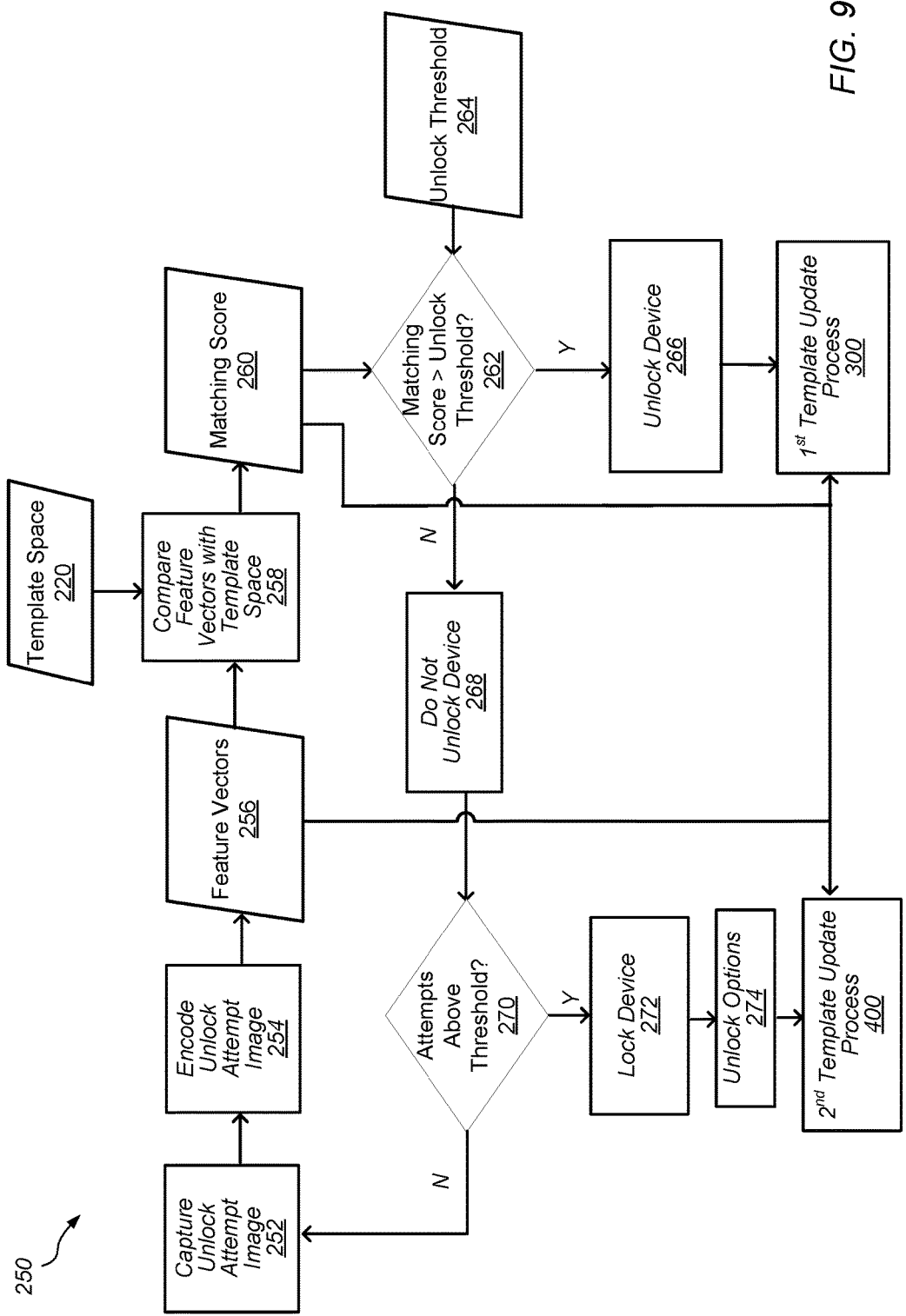
FIG. 9 depicts a flowchart of an embodiment of a facial recognition authentication process.

FIG. 9 depicts a flowchart of an embodiment of facial recognition authentication process 250. Process 250 may be used to authenticate a user as an authorized user of device 100 using facial recognition of the user. In certain embodiments, process 250 is used to authenticate a user using a single enrollment profile (e.g., single template space 220) on device 100. If multiple enrollment profiles are on device 100, one or more portions of process 250 may be operated in parallel (as described herein) to authenticate the user attempting to access and use the device. Authentication of the authorized user may allow the user to access and use device 100 (e.g., unlock the device) and/or have access to a selected functionality of the device (e.g., unlocking a function of an application running on the device, payment systems (i.e., making a payment), access to personal data, expanded view of notifications, etc.). In certain embodiments, process 250 is used as a primary biometric authentication process for device 100 (after enrollment of the authorized user). In some embodiments, process 250 is used as an authentication process in addition to another authentication process (e.g., fingerprint authentication, another biometric authentication, passcode entry, password entry, and/or pattern entry). In some embodiments, another authentication process (e.g., passcode entry, pattern entry, other biometric authentication) may be used to access device 100 if the user fails to be authenticated using process 250.

In 252, camera 102 captures an image of the face of the user attempting to be authenticated for access to device 100 (e.g., the camera captures an "unlock attempt" image of the user). It is to be understood that the unlock attempt image may be a single image of the face of the user (e.g., a single flood IR image or single depth map image) or the unlock attempt image may be a series of several images of the face of the user taken over a short period of time (e.g., one second or less). In some embodiments, the series of several images of the face of the user includes pairs of flood IR images and depth map images (e.g., pairs of consecutive flood IR and depth map images). In some implementations, the unlock attempt image may be a composite of several images of the user illuminated by the flood illuminator and the speckle pattern illuminator.

Camera 102 may capture the unlock attempt image in response to a prompt by the user. For example, the unlock attempt image may be captured when the user attempts to access device 100 by pressing a button (e.g., a home button or virtual button) on device 100, by moving the device into a selected position relative to the user's face (e.g., the user moves the device such that the camera is pointed at the user's face or lifting the device from a table), and/or by making a specific gesture or movement with respect to the device (e.g., tapping on the display or squeezing the device).

It is to be understood that, as described herein, unlock attempt images may include either flood IR images or depth map images, or a combination thereof. Further, the unlock attempt images may be processed in association with their corresponding template (e.g., flood IR images with a template for flood IR enrollment images) independently or in combination as needed.

In 254, the unlock attempt image is encoded to define the facial features of the user as one or more feature vectors in the feature space. In some embodiments, one feature vector is defined for the unlock attempt image. In some embodiments, multiple feature vectors are defined for the unlock attempt image. Unlock feature vector(s) 256 may be the output of the encoding of the unlock attempt image in 254.

In certain embodiments, in 258, unlock feature vector(s) 256 are compared to feature vectors in the templates of template space 220 to get matching score 260 for the unlock attempt image. In certain embodiments, template space 220 is the template space for a single enrollment profile on device 100. Matching score 260 may be a score of the differences between feature vector(s) 256 and feature vectors in template space 220 (e.g., feature vectors in static templates 216 and/or other dynamic templates 226 added to the template space as described herein). The closer (e.g., the less distance or less differences) that feature vector(s) 256 and the feature vectors in template space 220 are, the higher matching score 260 may be. For example, as shown in FIG. 5, feature vector 256A (open diamond) is closer to feature vectors 210 than feature vector 256B (open diamond)(e.g., feature vector 256B is a further outlier than feature vector 256A). Thus, feature vector 256A would have a higher matching score than feature vector 256B. As feature vector 256B is further away from feature vectors 210 than feature vector 256A, the lower matching score for feature vector 256B means less confidence that the face in the unlock attempt image associated with feature vector 256B is the face of the authorized user associated with the enrollment profile and template space 220.

In some embodiments, comparing feature vector(s) 256 and templates from template space 220 to get matching score 260 includes using one or more classifiers or a classification-enabled network to classify and evaluate the differences between feature vector(s) 256 and templates from template space 220. Examples of different classifiers that may be used include, but are not limited to, linear, piecewise linear, nonlinear classifiers, support vector machines, and neural network classifiers. In some embodiments, matching score 260 is assessed using distance scores between feature vector(s) 256 and templates from template space 220.

In 262, matching score 260 is compared to unlock threshold 264 for device 100. Unlock threshold 264 may represent a minimum difference (e.g., distance in the feature space) in features (as defined by feature vectors) between the face of the authorized user and the face of the user in the unlock attempt image that device 100 requires in order to unlock the device (or unlock a feature on the device). For example, unlock threshold 264 may be a threshold value that determines whether the unlock feature vectors (e.g., feature vectors 256) are similar enough (e.g., close enough) to the templates associated with the authorized user's face (e.g., static templates 216 in template space 220). As further example, unlock threshold 264 may be represented by circle 265 in feature space 212, depicted in FIG. 5. As shown in FIG. 5, feature vector 256A is inside circle 265 and thus feature vector 256A would have matching score 260 above unlock threshold 264. Feature vector 256B, however, is outside circle 265 and thus feature vector 256B would have matching score 260 below unlock threshold 264. In certain embodiments, unlock threshold 264 is set during manufacturing and/or by the firmware of device 100. In some embodiments, unlock threshold 264 is updated (e.g., adjusted) by device 100 during operation of the device as described herein.

As shown in FIG. 9, in 262, if matching score 260 is above unlock threshold 264 (i.e., the user's face in the unlock attempt image substantially matches the face of the authorized user), the user in the unlock attempt image is authenticated as the authorized user for the enrollment profile on device 100 and the device is unlocked in 266. In certain embodiments, after device 100 is unlocked in 266, unlock feature vectors 256 and matching score 260 are provided to first template update process 300, shown in FIG. 10, which may add or replace templates in template space 220. In 262, if matching score 260 is below unlock threshold 264 (e.g., not equal to or above the unlock threshold), then device 100 is not unlocked in 268 (e.g., the device remains locked). It should be noted that device 100 may be either locked or unlocked if matching score 260 is equal to unlock threshold 264 depending on a desired setting for the unlock threshold (e.g., tighter or looser restrictions). Additionally, either option for an equal matching score comparison may be also applied as desired for other embodiments described herein.

In certain embodiments, the unlock attempts are compared to a threshold in 270. The threshold may be, for example, a maximum number of unlock attempts allowed or a maximum allotted time for unlock attempts. In certain embodiments, a number of unlock attempts is counted (e.g., the number of attempts to unlock device 100 with a different unlock attempt image captured in 252) and compared to the maximum number of unlock attempts allowed.

In certain embodiments, if the unlock attempts reaches the threshold (e.g., number of unlock attempts reaches the maximum number of attempts allowed), then device 100 is locked from further attempts to use facial authentication in 272. In some embodiments, when the device is locked in 272, an error message may be displayed (e.g., on display 108) indicating that facial recognition authentication process 250 has failed and/or the desired operation of device 100 is restricted or prevented from being performed. Device 100 may be locked from further attempts to use facial authentication in 272 for a specified period of time and/or until another authentication protocol is used to unlock the device. For example, unlock options 274 may be used to unlock device 100.

Unlock options 274 may include the user being presented with one or more options for proceeding with a different type of authentication to unlock or access features on device 100 (e.g., the user is presented options for proceeding with a second authentication protocol). Presenting the options may include, for example, displaying one or more options on display 108 of device 100 and prompting the user through audible and/or visual communication to select one of the displayed options to proceed with unlocking the device or accessing features on the device. The user may then proceed with unlocking/accessing device 100 using the selected option and following additional audible and/or visual prompts as needed. After successfully being authenticated using the selected option, the user's initial request for unlocking/accessing device 100 may be granted. Unlock options 274 may include, but not be limited to, using a passcode, a password, pattern entry, a different form of biometric authentication, or another authentication protocol to unlock device 100. In some embodiments, unlock options 274 includes providing a "use passcode/password/pattern" affordance that, when selected causes display of a passcode/password/pattern entry user interface, or a passcode/password/pattern entry user interface, or a "use fingerprint" prompt that, when displayed, prompts the user to place a finger on a fingerprint sensor for the device. In some embodiments, after device 100 is unlocked using the unlock options in 274, unlock feature vectors 256 and matching score 260 are provided to second template update process 400, shown in FIG. 13.

If the unlock attempts are below the threshold in 270 (e.g., number of unlock attempts are below the maximum number of attempts allowed), then process 250 may be run again (re-initiated) beginning with a new unlock attempt image of the user being captured in 252. In some implementations, device 100 automatically captures the new unlock attempt image of the user's face without prompting the user (e.g., capturing of the new image is automatically implemented and/or hidden from the user). In some implementations, device 100 notifies the user (either visually and/or audibly) that process 250 is being re-initiated. In some embodiments, device 100 may prompt the user to provide input to re-initiate process 250. For example, the user may be prompted to acknowledge or otherwise confirm (either visually and/or audibly) the attempt to re-initiate process 250.

Figure 10:
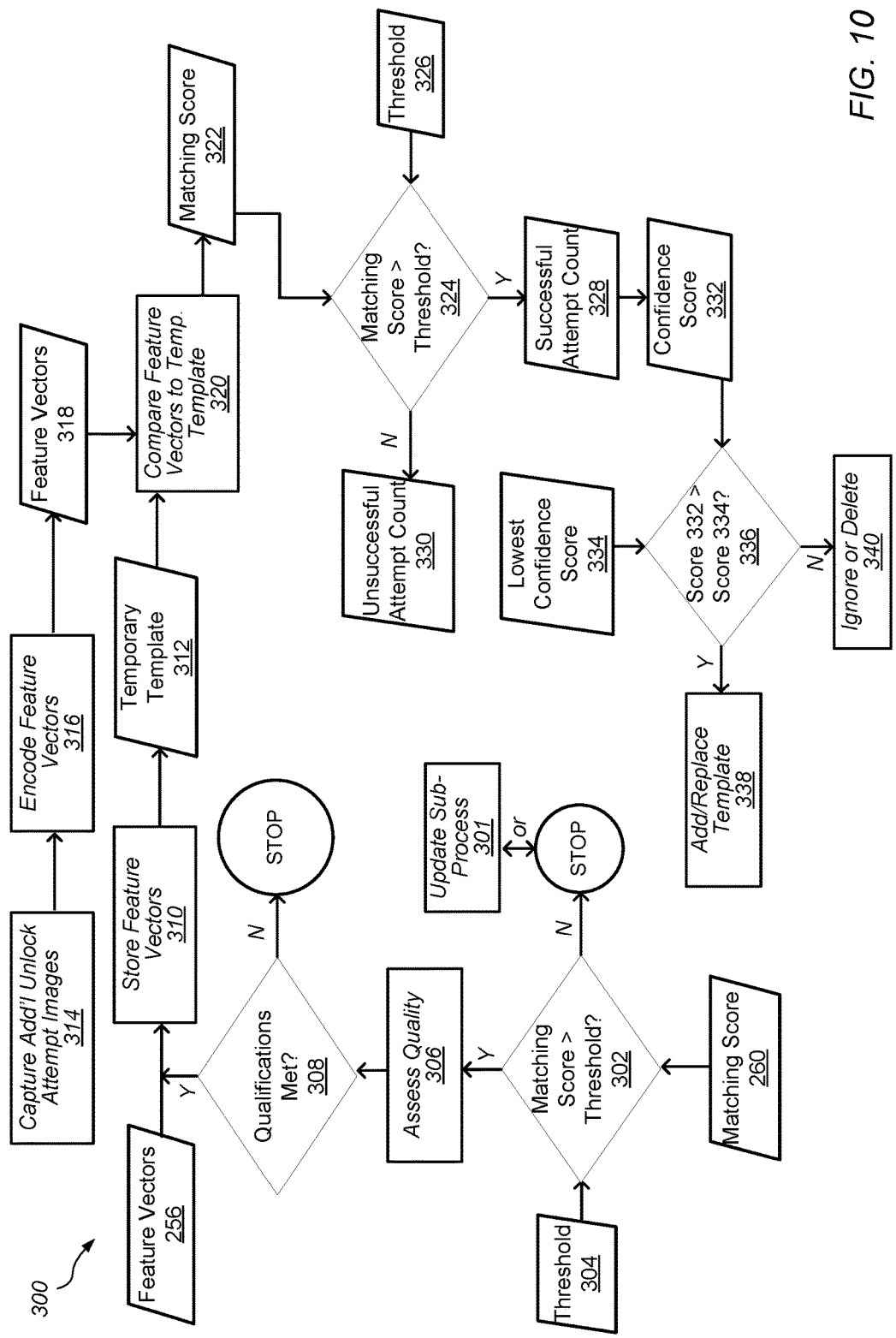
FIG. 10 depicts a flowchart of an embodiment of a template update process.

FIG. 10 depicts a flowchart of an embodiment of first template update process 300. Process 300 may be used to update template space 220 (shown in FIG. 6) with one or more additional dynamic templates 226 based on feature vector(s) 256 from process 250. In certain embodiments, process 300 is used to update template space 220 for a single enrollment profile (e.g., the enrollment profile used in process 250) on device 100. If multiple enrollment profiles are on device 100, process 300 may be operated separately for each enrollment profile to independently update the different enrollment profiles on the device (as described herein). Process 300 may be used to update template space 220 for gradual changes in the appearance of the authorized user associated with the enrollment profile. For example, process 300 may update template space 220 for gradual changes in hair (e.g., hair color, hair length, and/or hair style), weight gain, weight loss, changes in glasses worn, or small disfigurement changes (e.g., black eyes, scars, etc.). Updating template space 220 using process 300 allows the authorized user to continue to successfully access device 100 using facial recognition authentication process 250 despite the gradual changes in the appearance of the user.

Process 300 may begin by assessing 302 if matching score 260 is above threshold 304. Threshold 304 may be a threshold score for determining if feature vector(s) 256 are similar (e.g., close) enough to feature vectors 210 (from static templates 216) that feature vector(s) 256 may potentially be used as another template (e.g., the threshold score may determine if feature vectors 256 are within a certain distance of feature vectors 210). In certain embodiments, threshold 304 is greater than (above) unlock threshold 264 (e.g., threshold 304 requires a higher matching score than unlock threshold 264). Thus, the threshold for feature vector(s) 256 becoming a template may be stricter than the threshold for unlocking the device. Threshold 304 may be set during manufacturing and/or by the firmware of device 100. Threshold 304 may be updated (e.g., adjusted) by device 100 during operation of the device as described herein.

In some embodiments, if matching score 260 is below threshold 304, then process 300 is stopped and feature vector(s) 256 are deleted from device 100. In some embodiments, if matching score 260 is below threshold 304, then process 300 continues with template update sub-process 301, described in FIG. 12. If matching score 260 is above threshold 304, then process 300 is continued. In some embodiments, after assessing 302, one or more qualities in the unlock attempt image are assessed in 306. For example, pose (e.g., pitch, yaw, and roll of the face), occlusion, attention, field of view, and/or distance in the unlock attempt image may be assessed in 306. Pose and/or occlusion in the unlock attempt image may be assessed using the landmark and/or occlusion maps described herein. In 308, if suitable qualifications are not met, then process 300 may be stopped. In certain embodiments, meeting suitable qualifications includes meeting selected criteria in the images for one or more of the assessed qualities described above. For example, selected criteria may include, but not be limited to, the face of the user being in the field of view of the camera, a pose of the user's face being proper (e.g., the user's face is not turned too far in any direction from the camera (i.e., the pitch, yaw, and/or roll of the face are not above certain levels)), a distance to the face of the user being within a certain distance, the face of the user having occlusion below a minimum value (e.g., the user's face is not occluded (blocked) more than a minimum amount by another object), the user paying attention to the camera (e.g., eyes of the user looking at the camera), eyes of the user not being closed, and proper lighting (illumination) in the image. In some embodiments, assessing qualities in 306 and 308 may occur in a different location within process 300. For example, assessing qualities in 306 and 308 may occur after comparing matching score 324 to threshold 326 or after comparing confidence score 332 to confidence score 334 in 336, described below.

If suitable qualifications are met in 308, then process 300 continues, in 310, with storing feature vector(s) 256 in a backup space in the memory of device 100. The backup space in the memory may be, for example, a second space or temporary space in the memory that includes readable/writable memory and/or short term memory. Feature vector (s) 256 may be stored in the memory as temporary template 312.

In certain embodiments, after temporary template 312 is stored in the backup space in the memory, process 300 continues by comparing the temporary template to feature vectors for additional unlock attempt images captured by device 100 for the authorized user. In 314, additional unlock attempt images are captured of the user (or users if unauthorized access is attempted) as the user(s) during additional (future) unlocking attempts of device 100. The features of the face of the user in the additional unlock attempt images are encoded in 316 to generate feature vectors 318. In 320, feature vectors 318 are compared to temporary template 312 to get matching score 322.

Matching score 322 may then be compared in 324 to threshold 326. In some embodiments, threshold 326 is unlock threshold 264. In some embodiments, threshold 326 is threshold 304. If matching score 322 is above threshold 326 in 324, then a successful attempt is counted in 328. If matching score 322 is below threshold 326 in 324, then an unsuccessful attempt is counted in 330. Counts 328 and 330 may be continued until a desired number of unlock attempts are made (e.g., a desired number of comparisons of matching score 322 and threshold 326). Once the desired number of attempts is made, the number of successful attempts in 328 out of the total number of unlock attempts (e.g., the sum of counts 328 and 330) may be used to assess confidence score 332 for temporary template 312. For example, there may be 45 successful attempts out of 50 total unlock attempts so confidence score 332 is 45/50 or 90%. Confidence score 332 may be used to assess whether or not template 312 is added as dynamic template 226 to template space 220, shown in FIG. 6.

As described above, initially after enrollment, the enrollment templates (e.g., static templates 216, shown in FIG. 6) are added to static portion 222 of template space 220. After the enrollment process and static templates 216 are added to static portion 222, process 300, shown in FIG. 10, may be used to add additional templates to template space 220. Additional templates may be added to dynamic portion 224 as dynamic templates 226 (e.g., a portion from which templates may be added and deleted without a device reset being needed). Dynamic templates 226 may be used in combination with static templates 216 in template space 220 for facial recognition authentication process 250, shown FIG. 9.

In certain embodiments, temporary templates 312 generated by process 300, shown in FIG. 10, are added to dynamic portion 224 as dynamic templates 226, shown in FIG. 6, when confidence score 332 for temporary template 312 is higher than a lowest confidence score of static templates 216 in static portion 222. Confidence score 334 may be equal to a lowest confidence score for static templates 216 in static portion 222 assessed during the same unlock attempts used to assess confidence score 332 for temporary template 312 (e.g., the confidence score for the template with the lowest number of successful unlock attempts during the same unlock attempts using temporary template 312). Confidence score 334 may be assessed using the same threshold used for confidence score 332 (e.g., threshold 326).

In certain embodiments, if, in 336, confidence score 332 is greater than confidence score 334, then temporary template 312 is added, in 338, as dynamic template 226 in dynamic portion 224. For example, if temporary template 312 has 45 successful unlock attempts out of 50 total unlock attempts while one static template 216 only has 40 successful unlock attempts out of the same 50 total unlock attempts, then temporary template 312 may be added to dynamic portion 224 as one of dynamic templates 226. If, in 336, confidence score 332 is less than confidence score 334, then temporary template 312 is ignored or deleted in 340. Temporary templates 312 may be added until a maximum number of allowed dynamic templates 226 are stored in dynamic portion 224.

Once dynamic portion 224 reaches its maximum number of dynamic templates 226 in dynamic portion 224, temporary template 312 may replace one of dynamic templates 226 in 338. For example, temporary template 312 may replace one of dynamic templates 226 if the temporary template is less of an outlier than one of dynamic templates 226. In certain embodiments, statistical analysis of the feature vectors that represent dynamic templates 226 and temporary template 312 is used to assess if temporary template 312 is less of an outlier than one of dynamic templates 226. Statistical analysis may include, for example, classification algorithms operated on feature vectors for the templates.

Figure 11:
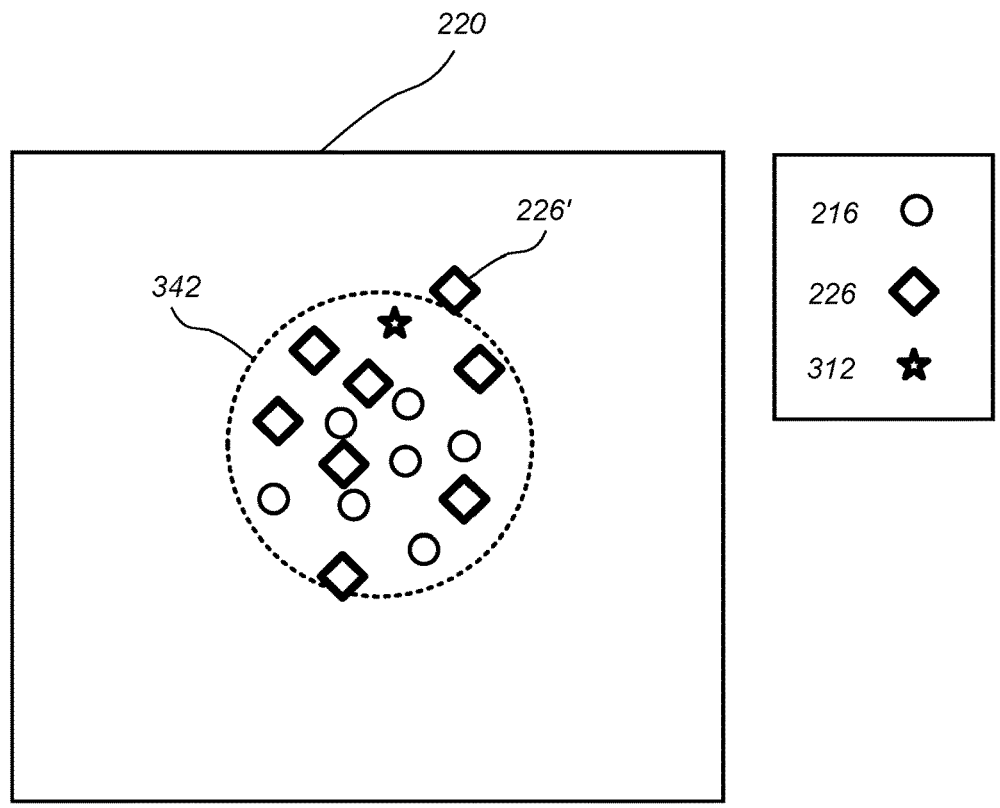
FIG. 11 depicts a representation of an embodiment of a template space represented as a feature space.

FIG. 11 depicts a representation of an embodiment of template space 220 represented as a feature space. In the feature space depiction of template space 220, static templates 216, dynamic templates 226, and temporary template 312 are represented by feature vectors. For example, static templates 216 are represented by circles, dynamic templates 226 are represented by diamonds, and temporary template 312 is represented by a star. In certain embodiments, as described above, static templates 216 are not allowed to be replaced by temporary template 312. Thus, if dynamic portion 224 has reached its maximum number of dynamic templates 226, temporary template 312 may replace one of dynamic templates 226 if temporary template 312 is less of an outlier than one of dynamic templates 226.

Statistical analysis of the feature vectors in the feature space correlating to template space 220 may generate a circle (e.g., circle 342) that most closely defines a maximum number of the feature vectors. As shown in FIG. 11, circle 342 defines the feature vector for dynamic template 226' as an outlier of the circle. The feature vector for dynamic template 226' is more of an outlier than the feature vector for temporary template 312. Thus, temporary template 312 may replace dynamic template 226' in template space 220. If temporary template 312 had been more of an outlier than each of dynamic templates 226, then the temporary template may not have replaced any one of dynamic templates 226.

In certain embodiments, when temporary template 312 replaces dynamic template 226' in template space 220, one or more thresholds for device 100 may be recalculated. As temporary template 312 is less of an outlier than dynamic template 226' recalculation of the threshold(s) may further restrict the thresholds (e.g., raise the threshold for matching scores to require closer matching). In some embodiments, the unlock threshold (e.g., unlock threshold 264, shown in FIG. 9) is made stricter when temporary template 312 replaces dynamic template 226' in template space 220. In some embodiments, a template update threshold (e.g., threshold 304, shown in FIG. 10) is made stricter when temporary template 312 replaces dynamic template 226' in template space 220.

Figure 12:
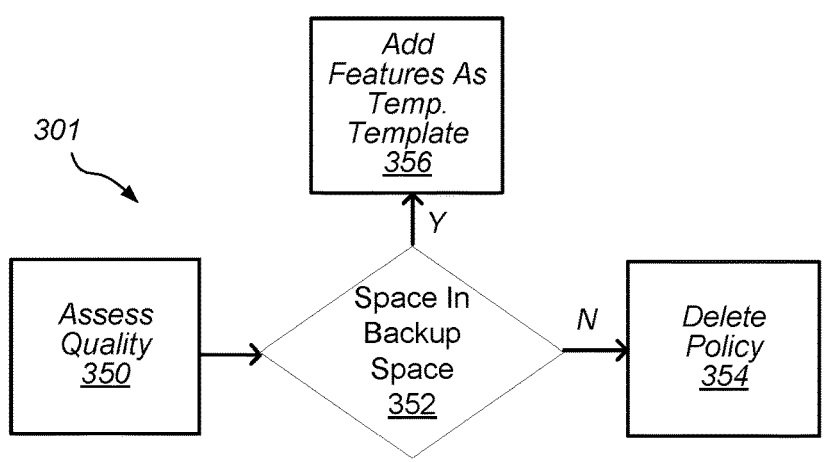
FIG. 12 depicts a flowchart of an embodiment of a template update sub-process.

FIG. 12 depicts a flowchart of an embodiment of template update sub-process 301. As described above, sub-process 301 may proceed if matching score 260 is below threshold 304 but above unlock threshold 264. Images with matching scores 260 in such a range (above unlock threshold 264 and below threshold 304) may have more uncertainty in matching than images that are above threshold 304 (while still being able to unlock device 100). Thus, these more uncertain images may be processed using sub-process 301.

In sub-process 301, one or more qualities in the unlock attempt image are assessed in 350. Assessing qualities of the unlock attempt image in 350 may be substantially similar to assessing qualities in 306 and 308, as shown in FIG. 10. As shown in FIG. 12, if the unlock attempt image passes the assessment of qualities (e.g., meets qualifications) in 350, then a determination may be made in 352 if there is space (e.g., room) in the backup space used for temporary templates 312 to store another temporary template (e.g., a determination if a maximum number of temporary templates 312 are stored in the backup space).

If there is no room in the backup space ("N"), then the unlock attempt image (and its corresponding feature vectors) may be subject to delete policy 354, as shown in FIG. 12. In delete policy 354, the feature vector(s) in the backup space (e.g., space for temporary templates 312) that has selected redundancy (e.g., is most redundant) to the existing features may be replaced in the backup space.

If there is room in the backup space ("Y"), then the feature vectors for the unlock attempt image are added to the backup space as a temporary template (e.g., temporary template 312) in 356. Once the temporary template from sub-process 301 is added to the backup space in 356, the temporary template may be processed substantially as temporary template 312 (e.g., compared to additional unlock attempt images as shown in FIG. 10). In certain embodiments, the temporary template from sub-process 301 is used as a template (e.g., temporary template 312 and/or dynamic template 226) for a selected amount of time. For example, because the temporary template from sub-process 301 is originally added with a higher uncertainty than other templates, the amount of time allowed for use of the temporary template from sub-process 301 may be limited (e.g., the temporary template has a limited lifetime). In some embodiments, the selected amount of time is a maximum amount of successful unlock attempts using the temporary template from sub-process 301.

As described above, first template update process 300 may be used to update an enrollment profile (e.g., templates in the template space) when device 100 is unlocked or accessed using facial authentication recognition process 250. First template update process 300 may be used, for example, to update the enrollment profile in response to gradual changes in a user's appearance (e.g., weight gain/loss).

In some embodiments, however, facial features of an authorized user (e.g., the user's facial appearance) may have changed drastically, or at least to a large enough extent, that the user may encounter difficulty unlocking or accessing features (e.g., operations) on device 100 using facial authentication recognition process 250, depicted in FIG. 9. Drastic or large extent changes in the user's facial appearance may include, for example, shaving of a beard or mustache, getting a large scar or other disfigurement to the face, making drastic changes in makeup, making drastic hair changes. In some cases, the user may also encounter difficulty in unlocking/accessing device 100 using facial authentication recognition process 250 if there was an error during the enrollment process and/or there are large differences between the user's environment during the unlock attempt and the time of enrollment. Encountering difficulty in unlocking device 100 using facial authentication recognition process 250 may be a frustrating experience for the user. When difficulty in unlocking device 100 using facial authentication recognition process 250 occurs due to the above described changes/issues, a second template update process (e.g., second template update process 400, described below) may be used to, at least temporarily, allow the user to unlock/access device using the facial authentication recognition process, despite the issues/changes, after verification of the user's identity using a second authentication protocol.

As shown in FIG. 9, the user may attempt a number of unlock attempts unsuccessfully using facial authentication recognition process 250 until the number of unsuccessful unlock attempts reaches the selected value in 270 and device 100 is locked from further attempts to use the facial authentication recognition process. At such time, the user may be presented with one or more options for proceeding with a different type of authentication to unlock or access features on device 100 in unlock options 274. After the user is successfully authenticated using the selected option, device 100 may, at least temporarily, update the user's enrollment profile (e.g., using second template update process 400 described below) to allow the user to be able to unlock/access the device in future unlock attempts using facial authentication recognition process 250 despite the changes in the user's facial appearance that previously prevented the user from using the facial authentication recognition process to unlock/access the device. Thus, the user, by successfully completing authentication using the selected option, may automatically be able to access device 100 using facial authentication recognition process 250 in future unlock attempts for at least a short period of time.

Figure 13:
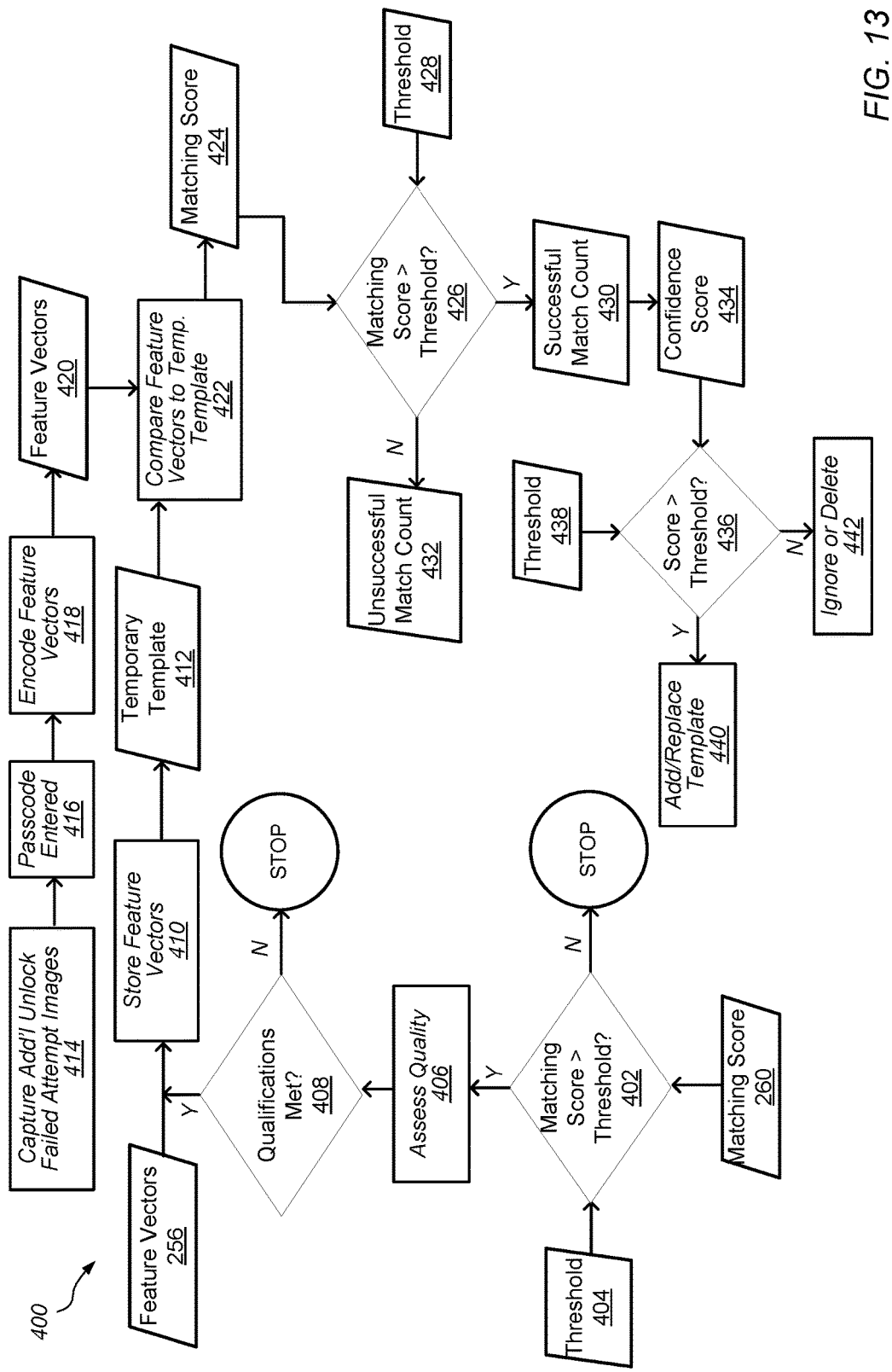
FIG. 13 depicts a flowchart of an additional embodiment of a template update process.

FIG. 13 depicts a flowchart of an embodiment of second template update process 400. Process 400 may be used when facial recognition authentication process 250 is unable to unlock device 100 but the device is unlocked using a passcode or other authentication protocol, as shown in FIG. 9. In some embodiments, process 400 may be used when device 100 is unlocked using the passcode immediately after the unlock attempt fails or within a specified time frame after the unlock attempt fails (e.g., in temporal proximity to the unlock attempt). In certain embodiments, process 400 is used to update template space 220 for a single enrollment profile (e.g., the enrollment profile used in process 250) on device 100. If multiple enrollment profiles are on device 100, process 400 may be operated on only the enrollment profile that is the closest match to the feature vectors from the captured unlock attempt image (as described herein).

In certain embodiments, process 400 is used to update template space 220 for the enrollment profile when facial features of the authorized user have changed to an extent that prevents feature vectors generated from an unlock attempt image (e.g., feature vectors 256) from being close enough (e.g., within the unlock threshold distance) to static templates 216 and/or dynamic templates 226 to allow device 100 to be unlocked using facial recognition authentication process 250, shown in FIG. 9. For example, process 400 may be used for feature vector 256B, which is depicted outside circle 265 (the unlock threshold circle) in FIG. 5. Possible causes for the user to be able to unlock device 100 using facial recognition authentication process 250 include, but are not limited to, if the authorized user shaves a beard or mustache, gets a large scar or other disfigurement to the face, large changes in makeup, drastic hair change, or has another severe change in a facial feature, these changes may be immediate changes or "step changes" in the facial features of the authorized user that do not allow first template update process 300 to update template space 220 gradually over time.

Second template update process 400 may begin by assessing in 402 if matching score 260 is above threshold 404. Threshold 404 may be a threshold score for determining if feature vector(s) 256 are similar (e.g., close) enough to feature vectors 210 (from static templates 216) that feature vector(s) 256 may potentially be used as another template. In certain embodiments, threshold 404 for process 400 is below unlock threshold 264. Threshold 404 may be below unlock threshold 264 (e.g., more distance allowed between feature vectors and the templates) because the passcode (or other authentication) has been entered prior to beginning process 400. Thus, the threshold for feature vector(s) 256 becoming a template in process 400 may be less strict than the threshold for unlocking the device and the threshold for process 300, shown in FIG. 10. Threshold 404 may, however, be set at a value that sets a maximum allowable distance between feature vectors 256 for the unlock attempt image and feature vectors for template space 220. Setting the maximum allowable distance may be used to prevent a user that is not the authorized user but has the passcode for device 100 to be enabled for facial recognition authentication on the device. Threshold 404 may be set during manufacturing and/or by the firmware of device 100. Threshold 404 may be updated (e.g., adjusted) by device 100 during operation of the device as described herein (e.g., after templates are added or replaced in template space 220).

Process 404 may be stopped and feature vector(s) 256 are deleted from device 100 if matching score 260 is below threshold 404. If matching score 260 is above threshold 404, then process 400 is continued. In some embodiments, after assessing 404, one or more qualities in the unlock attempt image are assessed in 406. For example, pose (e.g., pitch, yaw, and roll of the face), occlusion, attention, field of view, and/or distance in the unlock attempt image may be assessed in 406. In some embodiments, pose and/or occlusion in the unlock attempt image are assessed using the landmark and/or occlusion maps described herein. In 408, if suitable qualifications (as described above) are not met, then process 400 may be stopped.

If suitable qualifications are met in 408, then process 400 continues in 410 with storing feature vector(s) 256 in a backup space in the memory of device 100. The backup space in the memory for process 400 may be a different backup space than used for process 300. For example, the backup space in the memory for process 400 may be a temporary space in the memory that includes readable/writable memory partitioned from backup space used for process 300. Feature vector(s) 256 may be stored in the memory as temporary template 412.

In certain embodiments, after temporary template 412 is stored in the backup space, temporary template 412 may be compared to feature vectors for additional images from failed facial recognition authentication unlock attempts of device 100. For example, in process 400 additional unlock failed attempt images may be captured in 414. If the correct passcode is entered in 416, then feature vectors for the images captured in 414 may be encoded in 418 to generate feature vectors 420.

In certain embodiments, in 422, feature vectors 420 are compared to the feature vector(s) for temporary template 412. Comparison of feature vectors 420 and the feature vector(s) for temporary template 412 may provide matching score 424. Matching score 424 may be compared in 426 to threshold 428. Threshold 428 may be, for example, a similarity threshold or a threshold that defines at least a minimum level of matching between the feature vector(s) for temporary template 412 and feature vectors 420 obtained from the additional images from failed facial recognition authentication attempts that are followed by entering of the passcode for device 100. Thus, threshold 428 may be set at a value that ensures at least a minimum amount of probability that the change in the user's features that caused the failed unlock attempt and generated temporary template 412 is still present in the images from additional failed unlock attempts using facial recognition authentication.

If matching score 424 is above threshold 428 in 426, then a successful match is counted in 430. If matching score 424 is below threshold 428 in 426, then an unsuccessful match is counted in 432. Counts 430 and 432 may be continued until a desired number of failed unlock attempts are made using facial recognition authentication (e.g., a desired number of comparisons of matching score 424 and threshold 428). Once the desired number of attempts is made, the number of successful matches in 430 out of the total number of failed unlock attempts (e.g., the sum of counts 430 and 432) may be used to assess confidence score 434 for temporary template 412. For example, there may be 18 successful matches (e.g., comparisons) of matching score 424 and threshold 428 out of 20 total failed unlock attempts. Confidence score 434 may be used to assess whether or not template 412 is added as dynamic template 226 to template space 220 for the enrollment profile, shown in FIG. 6.

In some embodiments, it may be assumed that if a step change occurs in the facial features of the authorized user, the step change may remain for a number of successive unlock attempts using facial recognition authentication. For example, if the user shaved a beard, then the step change should remain for at least some length of time (e.g., at least a week). In such embodiments, if a successful unlock attempt (or a desired number of successful unlock attempts) using facial recognition authentication occurs before a selected number of successive unlock attempts is reached (e.g., 10 or 15 unlock attempts), then temporary template 412 may be deleted from the backup space in the memory. In some embodiments, the assumption that the step change may remain for a number of successive unlock attempts may not apply (e.g., if the user's step change was due to temporary application of makeup).

In certain embodiments, in 436, confidence score 434 is compared against threshold 438 to assess if the confidence score is greater than the threshold. Threshold 438 may be a threshold selected to ensure a minimum number of successful comparisons of matching score 424 and threshold 428 are reached before allowing template 412 to be added to template space 220. In 436, if confidence score 434 is greater than threshold 438, then, in 440, temporary template 412 may be added to template space 220 or temporary template 412 may replace a template in the template space 220 (e.g., replace one of dynamic templates 226). If confidence score 434 is less than threshold 438, then temporary template 412 may be ignored or deleted in 442.

As described above, temporary template 412 generated by process 400 may be added to dynamic portion 224 of template space 220 for the enrollment profile as one of dynamic templates 226, shown in FIG. 6. For process 400, shown in FIG. 13, the passcode (or other authentication) has been used to verify that temporary template 412 is for the authorized user. Thus, in certain embodiments, temporary template 412 is added to template space 220 in 440 without a need for comparison to dynamic templates 226 already in dynamic portion 224. If the maximum number of allowed dynamic templates 226 in dynamic portion 224 has not been reached, then temporary template 412 is added to the dynamic portion as one of dynamic templates 226.

If the maximum number of allowed dynamic templates 226 in dynamic portion 224 has been reached, then temporary template 412 may replace one of dynamic templates 226 in the dynamic portion. As the passcode (or other authentication) has been used to verify temporary template 412 is for the authorized user, the temporary template may replace one of dynamic templates 226 in dynamic portion 224 even if the temporary template is more of an outlier than each of dynamic templates 226. In certain embodiments, temporary template 412 replaces the largest outlier of dynamic templates 226 regardless of the relative lie (e.g., outlie) of the temporary template. In some embodiments, temporary template 412 may replace a dynamic template that is redundant (e.g., most redundant) to the existing dynamic templates even if the temporary template is more of an outlier than each of the dynamic templates.

Figure 14:
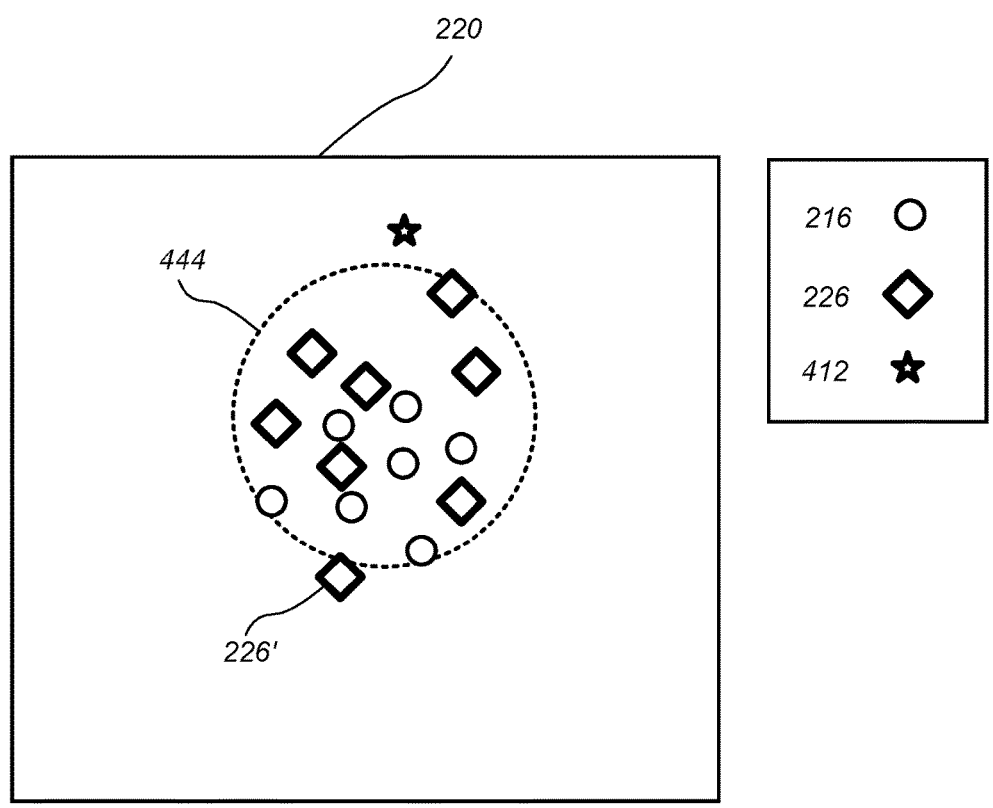
FIG. 14 depicts a representation of an additional embodiment of a template space represented as a feature space.

FIG. 14 depicts a representation of an embodiment of template space 220 represented as a feature space with a feature vector for temporary template 412. In the feature space depiction of template space 220 in FIG. 14, static templates 216, dynamic templates 226, and temporary template 412 are represented by feature vectors. Static templates 216 are represented by circles, dynamic templates 226 are represented by diamonds, and temporary template 412 is represented by a star. As described above, static templates 216 may not be replaced by temporary template 412. Thus, if dynamic portion 224 has reached its maximum number of dynamic templates 226, temporary template 412 may replace one of dynamic templates 226.

Statistical analysis of the feature vectors in the feature space correlating to template space 220 may generate a circle (e.g., circle 444) that most closely defines a maximum number of the feature vectors. As shown in FIG. 14, the feature vector for dynamic template 226' is the largest outlier of each of the feature vectors for dynamic templates 226. Thus, temporary template 412 may replace dynamic template 226' in template space 220 regardless of the position of the feature vector for the temporary template. In the example depicted in FIG. 14, the addition of the feature vector for temporary template 412 shifts circle 444 towards the feature vector for temporary template 412 and may cause the feature vector for dynamic template 226' to become the largest outlier of the circle. In some embodiments, when temporary template 412 replaces dynamic template 226' in template space 220, one or more thresholds for device 100 may be recalculated.

In some embodiments, a temporary template (e.g., either temporary template 312 or temporary template 412) may be used to unlock device 100 for a selected period of time while the temporary template is in the backup space of the memory (e.g., before the temporary template is added to template space 220). The temporary template may be used to unlock device 100 after the passcode (or other user authentication protocol) is used in combination with the temporary template. For example, for temporary template 412, the passcode has been entered to unlock device 100 before temporary template 412 is generated and stored in the backup space of the device memory. Temporary template 412 may then be used to allow unlocking of device 100 using facial recognition authentication for a selected time period (e.g., a few days or a week). After the selected time period expires, if temporary template 412 has not been added to template space 220, the user may be prompted for the passcode if facial recognition authentication of the user fails.

In certain embodiments, as described above, multiple enrollment profiles are generated on device 100. Multiple enrollment profiles may be generated, for example, to enroll multiple users on device 100 and/or to enroll multiple looks (e.g., appearances) for a single user. Multiple users may be enrolled on device 100 by generating enrollment profiles for additional users of the device using enrollment process 200. For example, a primary user (e.g., a parent) may allow a secondary user (e.g., a child) to generate a second enrollment profile on device 100 using enrollment process 200 to provide the secondary user with access to the device using facial recognition.

Multiple appearances for a single user may include appearances that are substantially different and cannot be recognized using a single enrollment profile. For example, the single user may have distinct appearances with wearing versus not wearing glasses, having a bearded face versus a shaved face, a face with heavy makeup versus a face without makeup has and/or other drastic changes at different times of day/week. For the distinct appearances, a single user may execute enrollment process 200 a first time to create a first enrollment profile for a first appearance (e.g., while wearing makeup) and execute the enrollment process a second time to create a second enrollment profile for a second appearance (e.g., while not wearing makeup). The user may access the device using facial recognition that authenticates the user with either the first enrollment profile or the second enrollment profile.

In embodiments with multiple enrollment profiles, image enrollment process 200 may be used to generate each enrollment profile (e.g., the first and second enrollment profiles) as a separate enrollment profile on device 100. For example, process 200 may be used to create separate template spaces (e.g., template spaces 220A and 220B shown in FIG. 8) for each enrollment profile. In a facial recognition authentication process, the separate template spaces may be independently compared to features from the unlock attempt image in order to authenticate the user for device 100. If the template space for any one of the enrollment profiles is determined to be a close match to the features in the unlock attempt image (e.g., the matching score is above the unlock threshold), then device 100 may be unlocked.

In some embodiments, if multiple enrollment profiles are stored on device 100, the unlock threshold is increased (e.g., the requirement for matching of features in the unlock attempt image is made stricter). When a new enrollment profile is generated, the amount the unlock threshold is increased may be based on the distance in feature space between the feature vectors associated with the templates for the new enrollment profile and the feature vectors associated with templates in existing enrollment profile(s) (e.g., the more distance there is between feature vectors in the template for the new enrollment profile and feature vectors in existing enrollment profiles, the more the unlock threshold is increased). In some embodiments, the new unlock threshold may also be adjusted based on a match history of the existing enrollment profiles (e.g., the more matches in the history of the existing profiles, the stricter the threshold may be).

Figure 15:
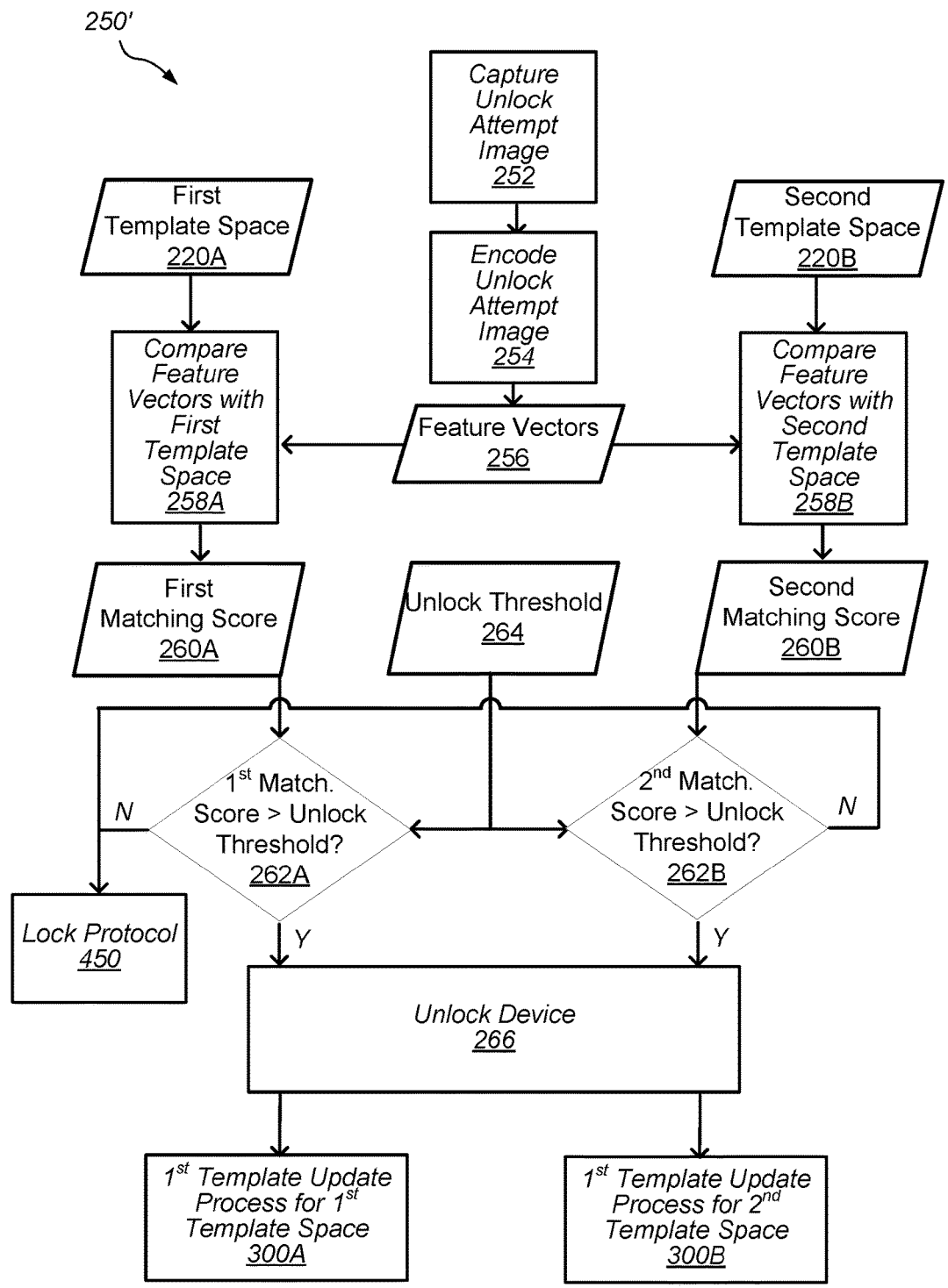
FIG. 15 depicts a flowchart of an embodiment of a facial recognition authentication process for use with multiple enrollment profiles.

FIG. 15 depicts a flowchart of an embodiment of facial recognition authentication process 250' for use with multiple enrollment profiles. FIG. 15 depicts process 250' for use with two enrollment profiles. It is to be understood, however, that process 250' may operate for any number of enrollment profiles stored on device 100. Process 250' may begin with camera 102 capturing, in 252, the unlock attempt image of the face of the user attempting to be authenticated for access to device 100. In 254, the unlock attempt image is encoded to define the facial features of the user as one or more feature vectors in the feature space. In some embodiments, one feature vector is defined for the unlock attempt image. In some embodiments, multiple feature vectors are defined for the unlock attempt image. Unlock feature vector(s) 256 may be the output of the encoding of the unlock attempt image in 254.

In 258A, unlock feature vector(s) 256 are compared to feature vectors in the templates of first template space 220A (the template space for the first enrollment profile) to get first matching score 260A for the unlock attempt image. In 258B, unlock feature vector(s) 256 are compared to feature vectors in the templates of second template space 220B (the template space for the second enrollment profile) to get second matching score 260A for the unlock attempt image. Matching scores 260A and 260B may be the scores of the differences between feature vector(s) 256 and feature vectors in template spaces 220A and 220B, respectively. After first matching score 260A and second matching score 260B are determined for the first enrollment profile and the second enrollment profile, respectively, the first matching score may be compared to unlock threshold 264 in 262A and the second matching score may be compared to the unlock threshold in 262B.

In certain embodiments, as shown in FIG. 15, unlock threshold 264 may be the same unlock threshold for both first matching score 260A (the matching score for the first enrollment profile associated with the primary authorized user) and second matching score 260B (the matching score for the second enrollment profile). In some embodiments, however, the unlock threshold may be different for the different enrollment profiles. For example, an unlock threshold for the second enrollment profile may be higher than an unlock threshold for the first enrollment profile associated with the primary authorized user (e.g., matching for the second enrollment profile is stricter than matching for the first enrollment profile).

In certain embodiments, generation of first matching score 260A in 258A and generation of second matching score 260B in 258B along with the comparison of first matching score 260A and second matching score 260B to unlock threshold 264 may operate in parallel (e.g., the matching scores are generated and compared to the unlock threshold independently and substantially simultaneously). In some embodiments, the generation and comparison of first matching score 260A and second matching score 260B to unlock threshold 264 are operated serially (e.g., first matching score 260A is generated and compared to the unlock threshold before second matching score 260B is generated and compared to the unlock threshold).

As shown in FIG. 15, if either first matching score 260A or second matching score 260B is above unlock threshold 264, (i.e., the user's face in the unlock attempt image substantially matches the face of the authorized user for either the first enrollment profile or the second enrollment profile), the user in unlock attempt image 252 is authenticated as an authorized user for device 100 and the device is unlocked in 266. If both first matching score 260A and second matching score 260B are below unlock threshold 264 (e.g., not equal to or above the unlock threshold), then device 100 remains locked and process 250' continues with lock protocol 450 (shown in FIG. 16).

After device 100 is unlocked in 266, unlock feature vectors 256 and first matching score 260A and/or second matching score 260B are provided to template update processes depending on the matching scores that are above unlock threshold 264. As shown in FIG. 15, if first matching score 260A is above unlock threshold 264, device 100 is unlocked in 266 and the first matching score is provided to process 300A along with feature vectors 256. Process 300A may be a template update process to update first template space 220A according to process 300 (shown in FIG. 10). Similarly, if second matching score 260B is above unlock threshold 264, device 100 is unlocked in 266 and the second matching score is provided to process 300B along with feature vectors 256. Process 300B may be a template update process to update second template space 220B according to process 300.

Process 300A and process 300B may only run if their corresponding matching score (e.g., first matching score 200A or second matching score 200B) is above unlock threshold 264. If both first matching score 200A and second matching score 200B are above unlock threshold 264, then process 300A and process 300B may both operate to update corresponding template spaces 220A and 220B. Processes 300A and 300B may operate in parallel (e.g., the processes operate simultaneously and independently) with the feature vectors from the same capture image(s) (e.g., feature vectors 256 for unlock attempt image 252).

Figure 16:
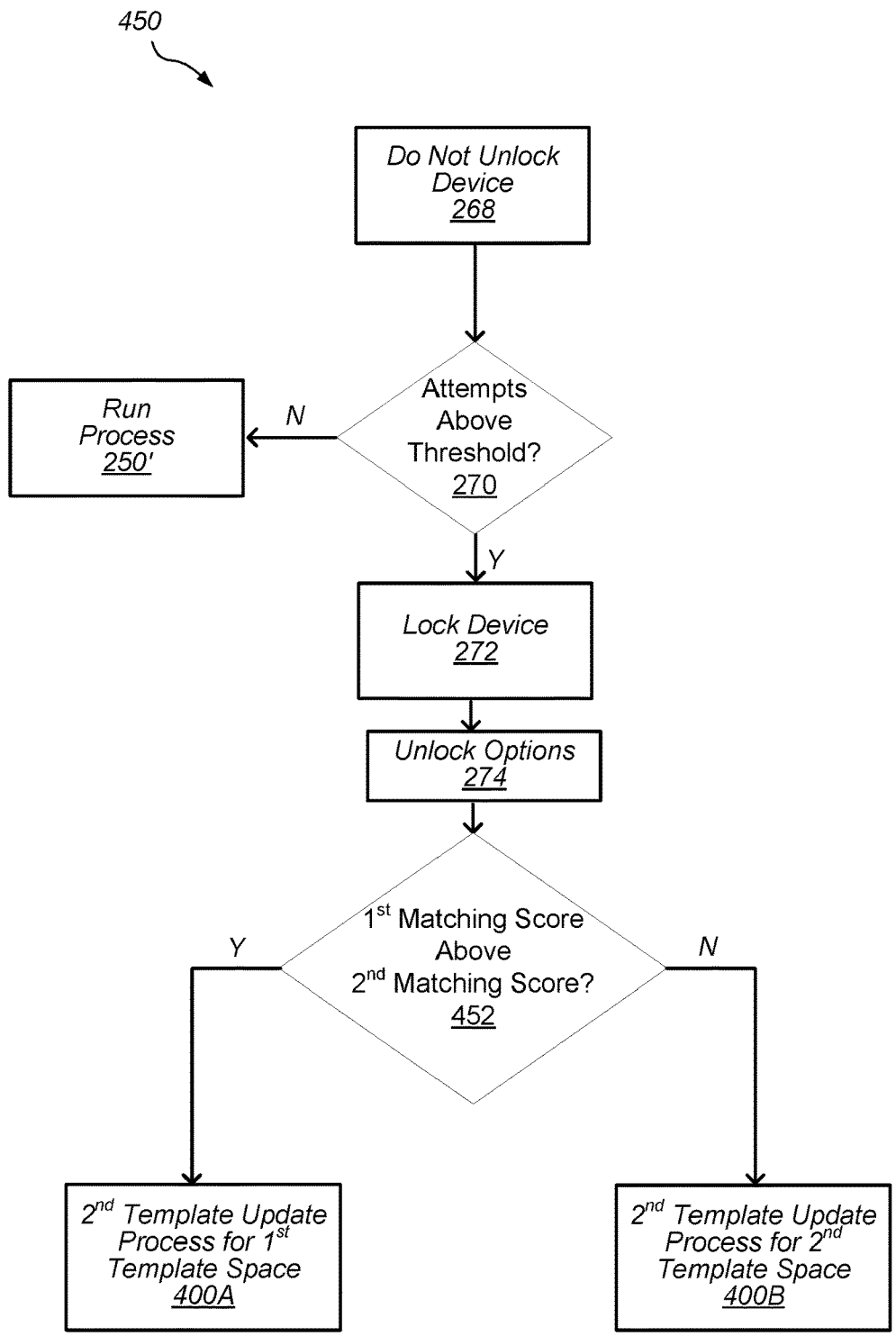
FIG. 16 depicts a flowchart of an embodiment of a lock protocol.

FIG. 16 depicts a flowchart of an embodiment of lock protocol 450. As described above, lock protocol 450 begins in facial recognition authentication process 250' when both first matching score 260A and second matching score 260B are below unlock threshold 264 and device 100 remains locked. Lock protocol 450 may include some operations from facial recognition authentication process 250, depicted in FIG. 9. For example, as shown in FIG. 16, lock protocol 450 may begin with the device not being unlocked in 268. In 270, a number of unlock attempts may be counted (e.g., the number of attempts to unlock device 100 with a different unlock attempt image captured in 252). If the number of unlock attempts in 270 is below the selected value (e.g., the threshold), then process 250' may be run again with another unlock attempt image (e.g., a new image of the user is captured and processed).

If the number of unlock attempts is above the selected value, then device 100 is locked from further attempts to use facial authentication in 272. In some embodiments, an error message may be displayed (e.g., on display 108) indicating that facial recognition authentication process 250' has failed and/or the desired operation of device 100 is restricted or prevented from being performed. Device 100 may be locked from further attempts to use facial authentication in 272 for a specified period of time and/or until another authentication protocol is used to unlock the device. In some embodiments, unlock options 274 are used to unlock device 100.

In certain embodiments, after device 100 is unlocked using one of the unlock options in 274, first matching score 260A and second matching score 260B may be compared in 452. If first matching score 260A is above second matching score 260B, the first enrollment profile (and first template space 220A) may have feature vectors that are closest (e.g., least distance) to feature vectors 256 of unlock attempt image 252. If first matching score 260A is below second matching score 260B, the second enrollment profile (and second template space 220B) may have feature vectors that are closest (e.g., least distance) to feature vectors 256 of unlock attempt image 252.

As shown in FIG. 16, when first matching score 260A is above second matching score 260B, unlock feature vectors 256 and first matching score 260A may be provided to second template update process for first template space 400A. Process 400A may be a template update process to update first template space 220A according to process 400. When first matching score 260A is below second matching score 260B, unlock feature vectors 256 and second matching score 260B may be provided to process 400B. Process 400B may be a template update process to update second template space 220B according to process 400. As shown in FIG. 16, only the template space closest to feature vectors 256 may be updated when lock protocol 450 is implemented. Updating only the template space closest to feature vectors 256 may prevent disambiguation between template spaces (and enrollment profiles) on the device to prevent unwanted access to the device between enrollment profiles.

In some embodiments, template spaces described herein (e.g., template spaces 220, 220A, and/or 220B) are updated to include dynamic templates for multiple orientations or angles of device 100 relative to the user's face (e.g., multiple poses of the user's face with respect to the device). For example, a first set of dynamic templates may be generated for a first pose of the user's face with respect to device 100 while a second set of dynamic templates may be generated for a second pose of the user's face with respect to the device. In some embodiments, the first pose of the user's face is a normal pose (e.g., the user's face is normally positioned upright relative to the device with the full face (or most of the face) of the user positioned in front of the camera). The second pose of the user's face may be, for example, an upside-down pose (e.g., the user's face is rotated about 180° from the normal pose).

In some embodiments, in the second pose, the user's face may have a low-pitch angle relative to the camera because the camera is turned upside-down relative to the user's face. With the low-pitch angle and the user's face being upside-down, the user's chin may occlude or block some features of the user's face. For example, the chin may block or occlude portions of the user's eyes. The user's nose may also block or occlude portions of the user's eyes in the low-pitch angle and upside-down pose.

As a user may often pick up or grab device 100 in any orientation (e.g., the user may not be aware of the orientation of the device or have any intention to rotate the device to the proper orientation), allowing the device to unlock using facial authentication with multiple pose angles (e.g., normal pose and low-pitch (upside-down) pose) may provide increased usability of the device for the user. Increasing the usability of device 100 may increase user satisfaction with operation of facial authentication on the device.

Figure 17:
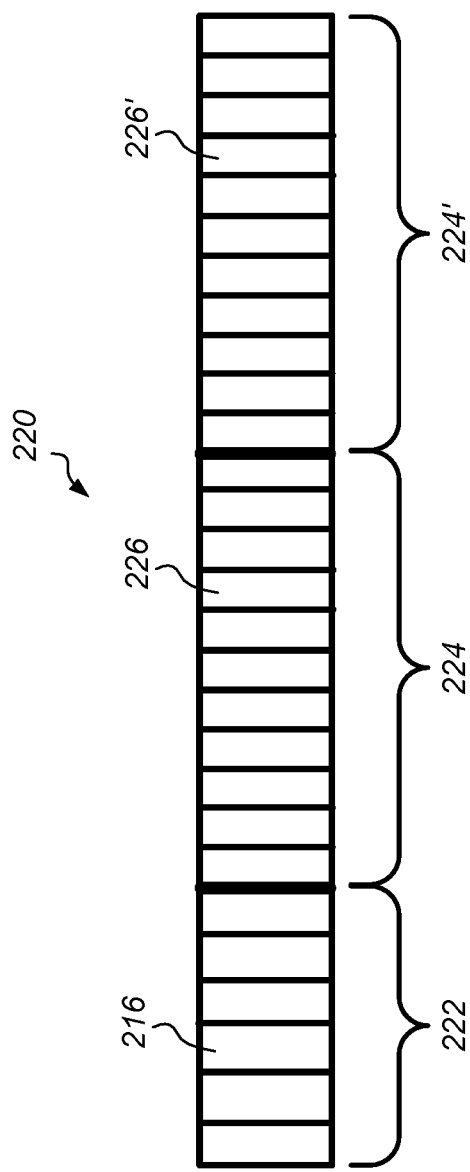
FIG. 17 depicts a representation of an embodiment of a template space with two sets of dynamic templates.

In certain embodiments, the template space for an enrollment profile (e.g., template space 220) includes separate sets of dynamic templates for the different pose angles. For example, the template space may include a first set of dynamic templates for the first (normal or frontal) pose and a second set of dynamic templates for the second (upside-down or low-pitch angle) pose. FIG. 17 depicts a representation of an embodiment of template space 220' with two dynamic portions 224 and 224'. Dynamic portion 224 may include a first set of dynamic templates 226 and dynamic portion 224' may include a second set of dynamic templates 226'. In certain embodiments, dynamic templates 226 are for the first (normal or frontal) pose and dynamic templates 226' are for the second (upside-down or low-pitch angle) pose. It is to be understood that additional dynamic portions and dynamic templates may also be contemplated. For example, a third dynamic portion and a third set of dynamic templates may be used for a landscape orientation of the user's face with respect to device 100.

In certain embodiments, dynamic templates 226' are generated using template update process 300 and/or template update process 400, which are described herein for generating dynamic templates 226. Dynamic templates 226' may be generated separately from dynamic templates 226 based on the pose or orientation of the device determined in "assess quality 306" during template update process 300 or "assess quality 406" in template update process 400, as shown in FIGS. 10 and 13, respectively, and described above. Thus, dynamic templates 226 may be generated by either template update process 300 or template update process 400 when the pose of the user is determined to be the first (normal or frontal) pose while dynamic templates 226' may be generated by template update process 300 or template update process 400 when the pose of the user is determined to be the second (upside-down or low-pitch angle) pose.

For example, if in "assess quality 306", template update process 300 determines that the pose of the user is the first (normal or frontal) pose, then the template update process adds dynamic template 226 to dynamic portion 224 of template space 220. Alternatively, if in "assess quality 306", template update process 300 determines that the pose of the user is the second (upside-down or low-pitch angle) pose, then the template update process adds dynamic template 226' to dynamic portion 224' of template space 220. Dynamic templates 226, 226' may be added to dynamic portions 224, 224', respectively, until a maximum number of templates in each portion is reached. In certain embodiments, dynamic portions 224, 224' have the same maximum number of dynamic templates 226, 226'. In some embodiments, dynamic portions 224, 224' have different maximum number of dynamic templates 226, 226'.

Figure 18:
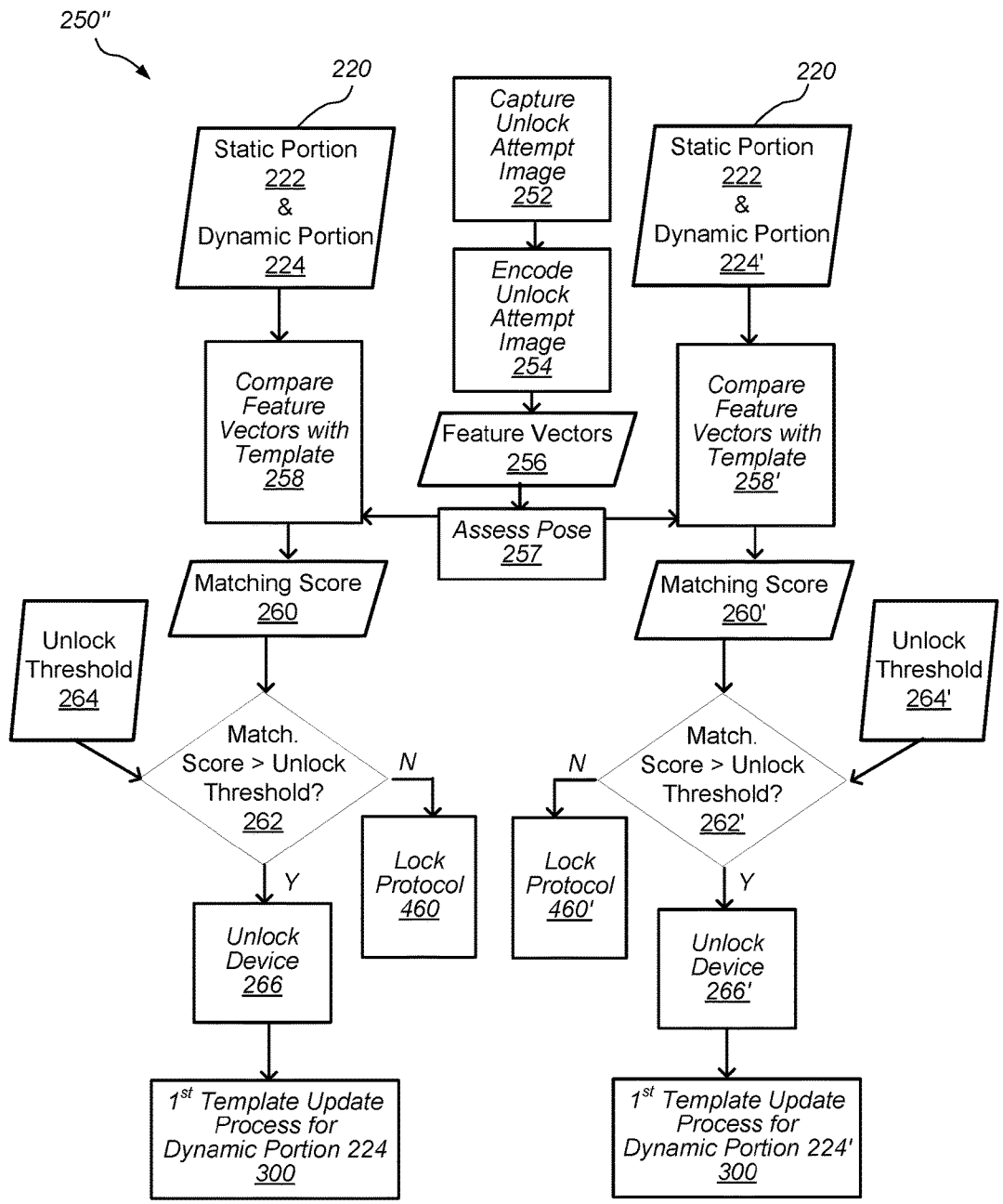
FIG. 18 depicts a flowchart of an embodiment of a facial recognition authentication process for use with multiple enrollment profiles.

In implementations using multiple dynamic portions for multiple poses of the user, a facial recognition authentication process may assess a pose (e.g., orientation with respect to device 100) of the user to determine the set of dynamic templates (e.g., the dynamic portion) that is to be used in determining a matching score for an unlock attempt image. FIG. 18 depicts a flowchart of an embodiment of facial recognition authentication process 250" for use with multiple dynamic portions. FIG. 18 depicts process 250" for use with two dynamic portions (e.g., dynamic portions 224 and 224'). It is to be understood, however, that process 250" may operate for any number of dynamic portions stored on device 100.

Process 250" may begin with camera 102 capturing, in 252, the unlock attempt image of the face of the user attempting to be authenticated for access to device 100. In 254, the unlock attempt image is encoded to define the facial features of the user as one or more feature vectors in the feature space. In some embodiments, one feature vector is defined for the unlock attempt image. In some embodiments, multiple feature vectors are defined for the unlock attempt image. Feature vector(s) 256 (e.g., unlock feature vectors) may be the output of the encoding of the unlock attempt image in 254.

In 257, a pose of the user's face in the unlock attempt image may be assessed. Assessing the pose may include assessing an orientation of the user's face relative to device 100. For example, the user's face may be assessed to be in a normal orientation (e.g., upright) relative to device 100 or in an abnormal orientation (e.g., upside down) relative to the device. In certain embodiments, the pose of the user's face is assessed using feature vectors 256. For example, a neural network module may be trained to assess the pose of the user's face based on feature vectors 256. An example for assessing feature vectors to determine the pose of the user's face is found in U.S. patent application Ser. No. 15/910,551 to Gernoth et al., which is incorporated by reference as if fully set forth herein. In some embodiments, data from one or more sensors on device 100 may be used to assess the pose of the user's face based on the orientation of the device. For example, accelerometers and/or gyroscopes on device 100 may be used to assess the orientation of the device relative to the user's face or body and determine the pose of the user's face in a captured image.

As shown in FIG. 18, process 250" may continue using either dynamic portion 224 or dynamic portion 224' based on the pose assessed in 257 (in addition to using static portion 222 in template space 220). In certain embodiments, as described herein, dynamic portion 224 is used in combination with static portion 222 when pose is assessed to be the first (normal or frontal) pose. Dynamic portion 224' may be used in combination with static portion 222 when pose is assessed to be the second (upside-down or low-pitch angle) pose. Thus, process 250" continues optionally using either dynamic portion 224 or dynamic portion 224', based on the assessed pose, in addition to static portion 222 in attempting to authenticate the user in the captured unlock attempt image.

In certain embodiments, after pose is assessed in 257 and the dynamic portion to be used is determined based on the assessed pose, process 250" continues in 258 (or optionally 258'), as shown in FIG. 18. In 258 (or 258'), feature vector(s) 256 are compared to feature vectors in the templates of template space 220 (using dynamic portion 224 or dynamic portion 224') to get matching score 260 (for dynamic portion 224) or matching score 260' (for dynamic portion 224') for the unlock attempt image.

After matching score 260 (or matching score 260' based on the assessed pose) is determined, the matching score may be compared to unlock threshold 264 in 262 (for matching score 260) or unlock threshold 264' in 262' (for matching score 260'). In certain embodiments, unlock threshold 264' has tighter restrictions (e.g., is stricter for matching) than unlock threshold 264. Tighter restrictions may be placed on unlock threshold 264' because of the features available for assessment in images with the second pose. As described above, typically in the second (upside-down or low-pitch angle) pose, the chin of the user may be a prominent feature while some portions of the upper part of the user's face including the eyes may be obstructed or occluded from being assessed in the image (e.g., less feature vectors may be assessed for the eyes or the area around the eyes of the user's face). Assessing a user's chin to determine an identity of a user may be less reliable than assessing features in and around the user's eyes. Thus, to maintain security levels suitable for the facial recognition authentication process on device 100, the tighter restrictions may be placed on unlock threshold 264'.

As shown in FIG. 18, when dynamic portion 224 is used based on the assessed pose, if matching score 260 is above unlock threshold 264 (i.e., the user's face in the unlock attempt image substantially matches the face of the authorized user), the user in unlock attempt image 252 is authenticated as an authorized user for device 100 and the device is unlocked in 266. Similarly, when dynamic portion 224' is used based on the assessed pose, if matching score 260' is above unlock threshold 264', the user in unlock attempt image 252 is authenticated as the authorized user for device 100 and the device is unlocked in 266'. After device 100 is unlocked in 266 (or 266'), unlock feature vectors 256 and the processed matching score (either matching score 260 or matching score 260') are provided to template update process 300 (shown in FIG. 10). Template update process 300 then operates to update the corresponding dynamic portion that has operated process 250" (e.g., either dynamic portion 224 or dynamic portion 224').

In certain embodiments, as shown in FIG. 18, when dynamic portion 224 is used based on the assessed pose, if matching score 260 is below unlock threshold 264 (e.g., not equal to or above the unlock threshold), then device 100 remains locked and process 250" continues with lock protocol 460 (shown in FIG. 19). When dynamic portion 224' is used based on the assessed pose, if matching score 260' is below unlock threshold 264' (e.g., not equal to or above the unlock threshold), then device 100 remains locked and process 250" continues with lock protocol 460' (shown in FIG. 20).

Figure 19:
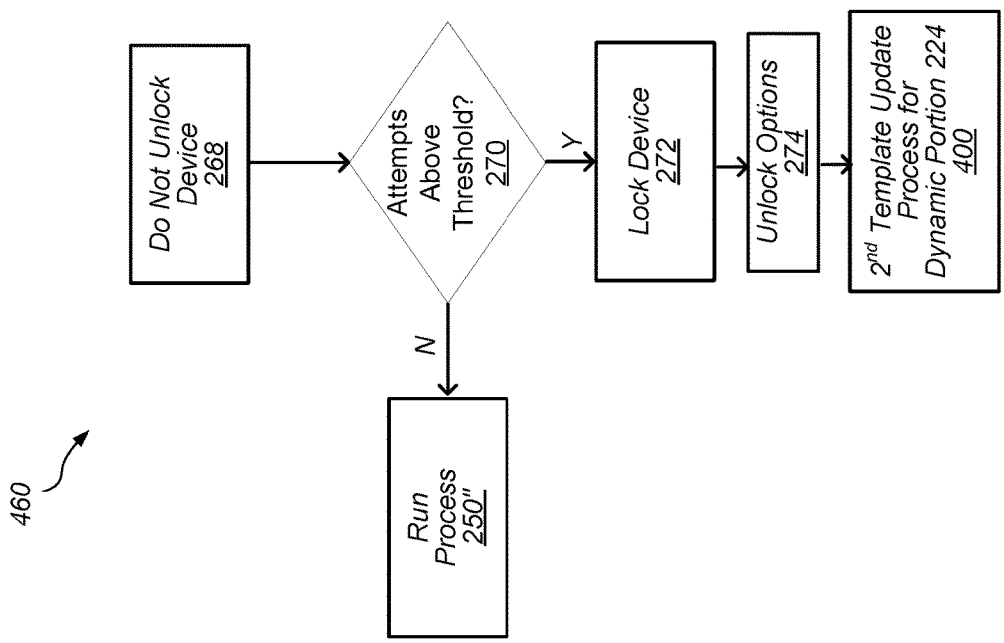
FIG. 19 depicts a flowchart of another embodiment of a lock protocol.

FIG. 19 depicts a flowchart of an embodiment of lock protocol 460. As described above, lock protocol 460 begins in facial recognition authentication process 250" when matching score 260 is below unlock threshold 264 and device 100 remains locked. Lock protocol 460 may include some operations from facial recognition authentication process 250, depicted in FIG. 9. For example, as shown in FIG. 19, lock protocol 460 may begin with the device not being unlocked in 268. In 270, a number of unlock attempts may be counted (e.g., the number of attempts to unlock device 100 with a different unlock attempt image captured in 252). If the number of unlock attempts in 270 is below the selected value (e.g., the threshold), then process 250" may be run again with another unlock attempt image (e.g., a new image of the user is captured and processed).

If the number of unlock attempts is above the selected value, then device 100 is locked from further attempts to use facial authentication in 272. In some embodiments, an error message may be displayed (e.g., on display 108) indicating that facial recognition authentication process 250" has failed and/or the desired operation of device 100 is restricted or prevented from being performed. Device 100 may be locked from further attempts to use facial authentication in 272 for a specified period of time and/or until another authentication protocol is used to unlock the device. In some embodiments, unlock options 274 are used to unlock device 100. In certain embodiments, after device 100 is unlocked using one of the unlock options in 274, feature vectors 256 and matching score 260 may be provided to second template update process 400 (shown in FIG. 13) to update dynamic portion 224.

Figure 20:
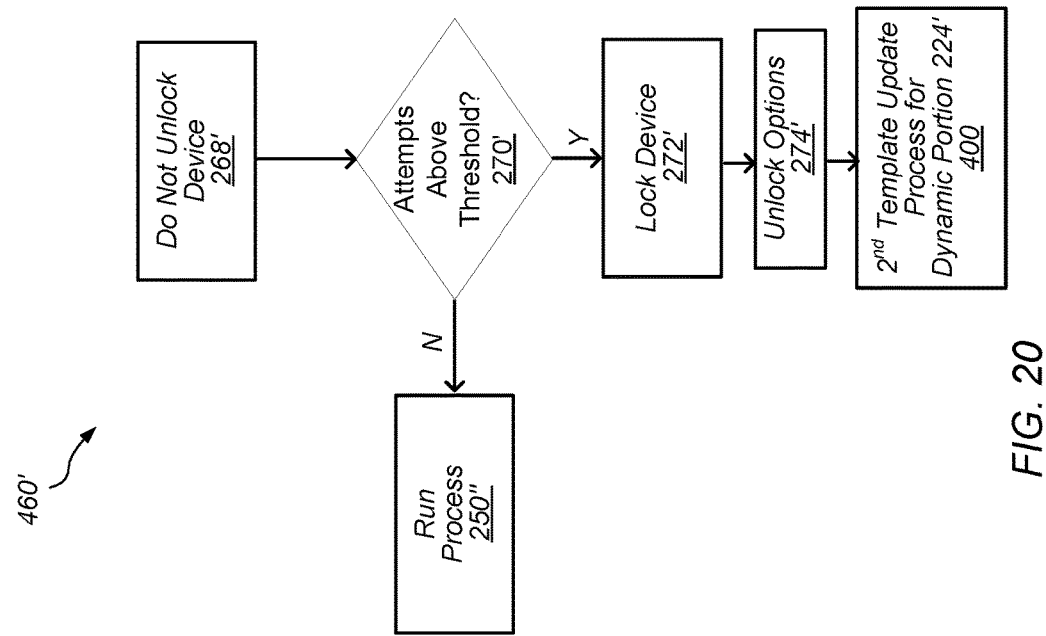
FIG. 20 depicts a flowchart of yet another embodiment of a lock protocol.

FIG. 20 depicts a flowchart of an embodiment of lock protocol 460'. As described above, lock protocol 460' begins in facial recognition authentication process 250" when matching score 260' is below unlock threshold 264' and device 100 remains locked. Lock protocol 460' may include some operations from facial recognition authentication process 250, depicted in FIG. 9. For example, as shown in FIG. 20, lock protocol 460' may begin with the device not being unlocked in 268'. In 270', a number of unlock attempts may be counted (e.g., the number of attempts to unlock device 100 with a different unlock attempt image captured in 252). If the number of unlock attempts in 270' is below the selected value (e.g., the threshold), then process 250" may be run again with another unlock attempt image (e.g., a new image of the user is captured and processed).

If the number of unlock attempts is above the selected value, then device 100 is locked from further attempts to use facial authentication in 272'. In some embodiments, an error message may be displayed (e.g., on display 108) indicating that facial recognition authentication process 250" has failed and/or the desired operation of device 100 is restricted or prevented from being performed. Device 100 may be locked from further attempts to use facial authentication in 272' for a specified period of time and/or until another authentication protocol is used to unlock the device. In some embodiments, unlock options 274' are used to unlock device 100. In certain embodiments, after device 100 is unlocked using one of the unlock options in 274', feature vectors 256 and matching score 260' may be provided to second template update process 400 (shown in FIG. 13) to update dynamic portion 224'.

In certain embodiments, one or more process steps described herein may be performed by one or more processors (e.g., a computer processor) executing instructions stored on a non-transitory computer-readable medium. For example, process 200, process 250, process 300, and process 400, shown in FIGS. 4, 9, 10, and 13, may have one or more steps performed by one or more processors executing instructions stored as program instructions in a computer readable storage medium (e.g., a non-transitory computer readable storage medium).

Figure 21:
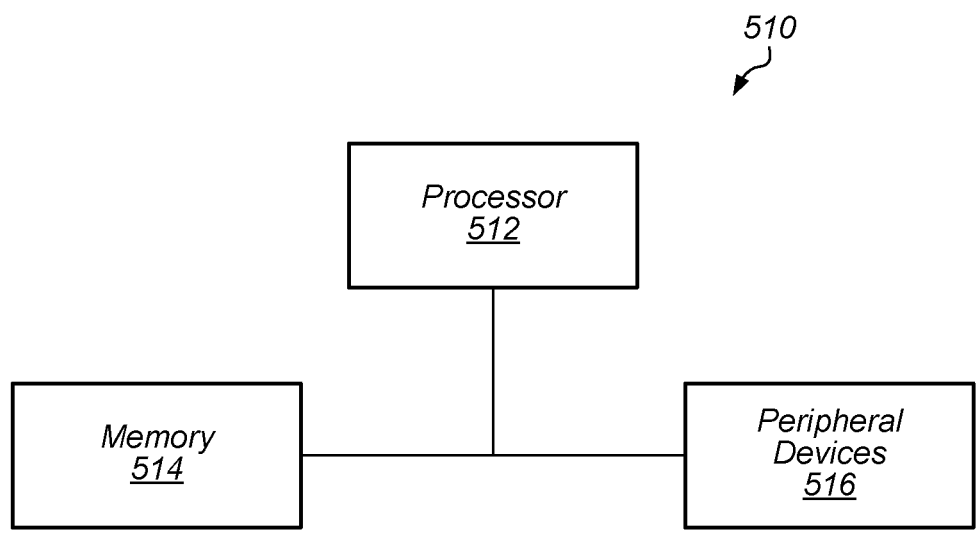
FIG. 21 depicts a block diagram of one embodiment of an exemplary computer system.

FIG. 21 depicts a block diagram of one embodiment of exemplary computer system 510. Exemplary computer system 510 may be used to implement one or more embodiments described herein. In some embodiments, computer system 510 is operable by a user to implement one or more embodiments described herein such as process 200, process 250, process 300, and process 400, shown in FIGS. 4, 9, 10, and 13. In the embodiment of FIG. 21, computer system 510 includes processor 512, memory 514, and various peripheral devices 516. Processor 512 is coupled to memory 514 and peripheral devices 516. Processor 512 is configured to execute instructions, including the instructions for process 200, process 250, process 300, and/or process 400, which may be in software. In various embodiments, processor 512 may implement any desired instruction set (e.g. Intel Architecture-32 (IA-32, also known as x86), IA-32 with 64-bit extensions, x86-64, PowerPC, Sparc, MIPS, ARM, IA-64, etc.). In some embodiments, computer system 510 may include more than one processor. Moreover, processor 512 may include one or more processors or one or more processor cores.

Processor 512 may be coupled to memory 514 and peripheral devices 516 in any desired fashion. For example, in some embodiments, processor 512 may be coupled to memory 514 and/or peripheral devices 516 via various interconnect. Alternatively or in addition, one or more bridge chips may be used to coupled processor 512, memory 514, and peripheral devices 516.

Memory 514 may comprise any type of memory system. For example, memory 514 may comprise DRAM, and more particularly double data rate (DDR) SDRAM, RDRAM, etc. A memory controller may be included to interface to memory 514, and/or processor 512 may include a memory controller. Memory 514 may store the instructions to be executed by processor 512 during use, data to be operated upon by the processor during use, etc.

Figure 22:
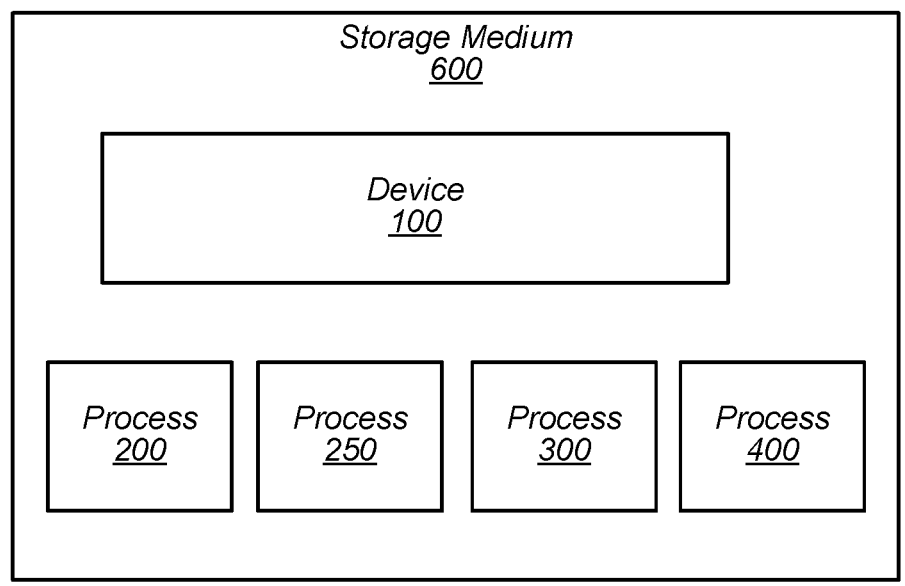
FIG. 22 depicts a block diagram of one embodiment of a computer accessible storage medium.

Peripheral devices 516 may represent any sort of hardware devices that may be included in computer system 510 or coupled thereto (e.g., storage devices, optionally including computer accessible storage medium 600, shown in FIG. 22, other input/output (I/O) devices such as video hardware, audio hardware, user interface devices, networking hardware, etc.).

Turning now to FIG. 22, a block diagram of one embodiment of computer accessible storage medium 600 including one or more data structures representative of device 100 (depicted in FIG. 1) included in an integrated circuit design and one or more code sequences representative of process 200, process 250, process 300, and/or process 400 (shown in FIGS. 4, 9, 10, and 13). Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or nonvolatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 600 may store data in a non-transitory manner, where non-transitory in this context may refer to not transmitting the instructions/data on a signal. For example, non-transitory storage may be volatile (and may lose the stored instructions/data in response to a power down) or nonvolatile.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A device, comprising:
    a camera;
    at least one illuminator providing illumination;
    circuitry coupled to the camera and the illuminator, wherein the circuitry is programmed to:
        obtain at least one image of a face of a user using the camera while the face of the user is illuminated with the illumination;
        encode the at least one image to generate at least one feature vector, wherein the at least one feature vector represents one or more facial features of the user in the at least one image;
        determine a pose of the user in the at least one image;
        in response to the pose of the user being determined to be a first pose:
            compare the at least one feature vector to a first set of dynamic reference templates and a set of static reference templates to obtain a first matching score; and
            authorize the user to perform at least one operation on the device that requires authentication in response to the first matching score being above a first unlock threshold of the device;
        in response to the pose of the user being determined to be a second pose:
            compare the at least one feature vector to a second set of dynamic reference templates and the set of static reference templates to obtain a second matching score; and
            authorize the user to perform at least one operation on the device that requires authentication in response to the second matching score being above a second unlock threshold of the device.

2. The device of claim 1, wherein the pose of the user is an orientation of the user's face relative to device.

3. The device of claim 1, wherein the first pose is a normal orientation of the user's face relative to the device, and wherein the second pose is an upside-down orientation of the user's face relative to the device.

4. The device of claim 1, wherein the illumination is infrared illumination.

5. The device of claim 1, wherein the second unlock threshold is a higher threshold than the first unlock threshold.

6. The device of claim 1, wherein the set of static reference templates comprises templates generated during enrollment of an authorized user on the device.

7. The device of claim 1, wherein the circuitry is programmed to generate the first set of dynamic reference templates and the second set of dynamic reference templates using a template update process.

8. The device of claim 1, wherein the circuitry is programmed to determine the pose of the user in the at least one image by assessing the at least one feature vector.

9. The device of claim 1, wherein the circuitry is programmed to determine the pose of the user in the at least one image using machine learning.

10. A method, comprising:
    obtaining at least one image of a face of a user using a camera on a device while the user is illuminated with illumination from an illuminator on the device, the device comprising a computer processor and a memory;
    encoding the at least one image to generate at least one feature vector, wherein the at least one feature vector represents one or more facial features of the user in the at least one image;
    determining a pose of the user in the at least one image;
    comparing the at least one feature vector to a set of dynamic reference templates and a set of static reference templates to obtain a matching score, wherein the set of dynamic reference templates is selected from a plurality of sets of dynamic reference templates based on the determined pose of the user in the at least one image, the plurality of sets of dynamic reference templates comprising at least a first set of dynamic reference templates and a second set of dynamic reference templates, wherein the first set of dynamic reference templates is selected in response to the determined pose being a first pose, and wherein the second set of dynamic reference templates is selected in response to the determined pose being a second pose; and
    authorizing the user to perform at least one operation on the device that requires authentication in response to the matching score being above an unlock threshold of the device.

11. The method of claim 10, wherein the pose of the user is determined as an orientation of the user's face relative to device.

12. The method of claim 10, wherein the user is illuminated with infrared illumination from the illuminator on the device.

13. The method of claim 10, wherein comparing the at least one feature vector to the set of dynamic reference templates comprises comparing the at least one feature vector to the set of dynamic reference templates selected based on determining the first or the second pose of the user.

14. The method of claim 10, further comprising generating the set of static reference templates using an enrollment process operated on the device for the authorized user.

15. The method of claim 10, further comprising generating the first set of dynamic reference templates and the second set of dynamic reference templates using a template update process.

16. The method of claim 10, further comprising updating the selected set of dynamic reference templates in response to the matching score being above an update threshold, wherein updating the comprises:
    storing the at least one feature vector as a temporary template in the memory of device;
    obtaining a plurality of second images of the face of the user using the camera;
    encoding the second images to generate second feature vectors for the second images, wherein the second feature vectors represent one or more facial features of the user in the second images;

obtaining second matching scores for the second images by comparing the second feature vectors to the temporary template;

assessing a confidence score for the temporary template by assessing a number of the second matching scores that are above the unlock threshold; and adding the temporary template to the selected set of dynamic reference templates in response to determining the assessed confidence score is above a selected confidence score.

17. The method of claim 10, wherein determining the pose of the user in the at least one image comprises assessing the at least one feature vector using machine learning to determine the pose of the user in the at least one image.

18. A non-transient computer-readable medium including instructions that, when executed by one or more processors on a device, cause the device to:

obtain at least one image of a face of a user using the camera while the face of the user is illuminated with the illumination;

encode the at least one image to generate at least one feature vector, wherein the at least one feature vector represents one or more facial features of the user in the at least one image;

determine a pose of the user in the at least one image;

in response to the pose of the user being determined to be a first pose:

compare the at least one feature vector to a first set of dynamic reference templates and a set of static reference templates to obtain a first matching score; and authorize the user to perform at least one operation on the device that requires authentication in response to the first matching score being above a first unlock threshold of the device;

in response to the pose of the user being determined to be a second pose:

compare the at least one feature vector to a second set of dynamic reference templates and the set of static reference templates to obtain a second matching score; and authorize the user to perform at least one operation on the device that requires authentication in response to the second matching score being above a second unlock threshold of the device.

19. The non-transient computer-readable medium of claim 18, wherein the at least one image is captured while the user is illuminated with infrared illumination from the illuminator on the device.

20. The non-transient computer-readable medium of claim 18, wherein the instructions cause the device to determine the pose of the user in the at least one image using machine learning.

* * * * *